United States Patent
Slungare et al.

(10) Patent No.: US 8,936,295 B2
(45) Date of Patent: Jan. 20, 2015

(54) ARTICULATED SEATING SYSTEM

(71) Applicant: Bruno Independent Living Aids, Inc., Oconomowoc, WI (US)

(72) Inventors: Hans Bertil Slungare, Gråbo (SE); Joakim Lars Bergstrand, Gråbo (SE)

(73) Assignee: Bruno Independent Living Aids, Inc., Oconomowoc, WI (US)

( * ) Notice: Subject to any disclaimer, the term of this patent is extended or adjusted under 35 U.S.C. 154(b) by 0 days.

(21) Appl. No.: 13/666,063

(22) Filed: Nov. 1, 2012

(65) Prior Publication Data

US 2013/0113258 A1    May 9, 2013

Related U.S. Application Data

(60) Provisional application No. 61/556,214, filed on Nov. 5, 2011.

(51) Int. Cl.
  *B60N 2/24*    (2006.01)
  *B60N 2/16*    (2006.01)
  *B60N 2/14*    (2006.01)
  *B60N 2/02*    (2006.01)

(52) U.S. Cl.
  CPC ............... *B60N 2/14* (2013.01); *B60N 2/0232* (2013.01); *B60N 2/1625* (2013.01); *B60N 2/245* (2013.01); *B60N 2002/0236* (2013.01); *B60N 2002/024* (2013.01); *B60N 2002/0256* (2013.01)
  USPC .................................. 296/65.12; 297/344.21

(58) Field of Classification Search
  CPC .................................... B60N 2/14; B60N 2/16
  USPC ......... 296/65.09, 65.01, 65.06, 65.03, 64, 69; 297/344.1, 331, 15, 335, 334, 311, 297/312, 336, 378.13, 344.21; 248/503.1
  See application file for complete search history.

(56) References Cited

U.S. PATENT DOCUMENTS

| | | |
|---|---|---|
| 3,236,556 A | 2/1966 | Lathers |
| 4,155,587 A | 5/1979 | Mitchell |
| 4,278,387 A | 7/1981 | Seguela et al. |
| 4,457,663 A | 7/1984 | Hems et al. |
| 4,479,752 A | 10/1984 | Todd |
| 4,733,903 A | 3/1988 | Bailey |
| 4,989,888 A | 2/1991 | Qureshi et al. |

(Continued)

FOREIGN PATENT DOCUMENTS

| | | |
|---|---|---|
| EP | 808740 | 11/1997 |
| EP | 1698509 | 9/2006 |
| JP | 10129314 | 5/1998 |

*Primary Examiner* — Glenn Dayoan
*Assistant Examiner* — Sunsurraye Westbrook
(74) *Attorney, Agent, or Firm* — K&L Gates LLP

(57) ABSTRACT

An articulated seating system supports a user seat using a mounting assembly, a fore-aft slide assembly, a swivel assembly and an extension assembly driven by a drive packet having one or more motors or the like. The seat is moved from a secured drive position (e.g., a standard interior vehicle seat position) to an extension position (wherein the seat faces out of a vehicle doorway) and finally to an access position outside the vehicle, facilitating access for a user having limited mobility, strength, etc. Extendible supporting arms engage and enclose guide rollers to allow stable and precise control of lateral and vertical seat movement. Moving between the drive and extension positions, the seat can move through a narrow transition corridor in the motor vehicle. The motors can operate manually to allow securing the seat in the drive position despite power or other failure.

15 Claims, 22 Drawing Sheets

(56) References Cited

U.S. PATENT DOCUMENTS

| | | | |
|---|---|---|---|
| 5,042,864 A | 8/1991 | Mochizuki | |
| 5,094,420 A | 3/1992 | Aihara et al. | |
| 5,149,113 A | 9/1992 | Alldredge | |
| 5,373,915 A | 12/1994 | Tremblay | |
| 5,466,111 A | 11/1995 | Meyer | |
| 5,489,170 A | 2/1996 | Inoue et al. | |
| 5,524,952 A * | 6/1996 | Czech et al. | 296/65.12 |
| 5,630,638 A | 5/1997 | Hirasawa et al. | |
| 5,636,884 A | 6/1997 | Ladetto et al. | |
| 5,651,576 A | 7/1997 | Wallace | |
| 5,720,462 A | 2/1998 | Brodersen | |
| 5,746,465 A | 5/1998 | Jones et al. | |
| 5,769,480 A | 6/1998 | Gebhardt | |
| 5,890,764 A | 4/1999 | Lee | |
| 6,021,989 A | 2/2000 | Morita et al. | |
| 6,024,398 A | 2/2000 | Horton et al. | |
| 6,158,799 A | 12/2000 | Guilford | |
| 6,416,272 B1 | 7/2002 | Suehiro et al. | |
| 6,543,848 B1 | 4/2003 | Suga et al. | |
| 6,547,303 B1 * | 4/2003 | Anderson | 296/68 |
| 6,557,919 B2 * | 5/2003 | Suga et al. | 296/65.07 |
| 6,572,172 B1 | 6/2003 | Ninomiya et al. | |
| 6,688,665 B2 * | 2/2004 | Michel | 296/65.07 |
| 6,817,645 B2 * | 11/2004 | Taguchi et al. | 296/64 |
| 6,962,383 B2 | 11/2005 | Takenoshita et al. | |
| 7,316,441 B2 | 1/2008 | Iwatani et al. | |
| 7,334,829 B2 | 2/2008 | Fukui et al. | |
| 7,354,090 B1 | 4/2008 | Pomorski | |
| 7,399,035 B2 | 7/2008 | Kusanagi et al. | |
| 7,413,232 B1 | 8/2008 | Fukui et al. | |
| 7,472,958 B2 | 1/2009 | Sano et al. | |
| 7,527,320 B1 | 5/2009 | Nevell, Jr. | |
| 7,665,554 B1 | 2/2010 | Walsh | |
| 7,828,363 B1 | 11/2010 | Henry | |
| 7,845,703 B2 | 12/2010 | Panzarella et al. | |
| 7,909,482 B2 | 3/2011 | Veenstra et al. | |
| 8,029,043 B2 | 10/2011 | Baumann | |
| 8,033,570 B2 | 10/2011 | Sato et al. | |
| 8,033,589 B2 * | 10/2011 | Kusanagi et al. | 296/68.1 |
| 8,037,640 B2 | 10/2011 | Boddy et al. | |
| 8,041,483 B2 | 10/2011 | Breed | |
| 8,078,364 B2 * | 12/2011 | Mabuchi et al. | 701/49 |
| 2006/0182569 A1 | 8/2006 | Andersson | |
| 2006/0255640 A1 | 11/2006 | Kusanagi et al. | |
| 2007/0221429 A1 | 9/2007 | Fukui et al. | |
| 2007/0252424 A1 | 11/2007 | Tomaiwa et al. | |
| 2008/0185229 A1 | 8/2008 | Panzarella | |
| 2008/0224522 A1 | 9/2008 | Taguchi et al. | |
| 2009/0218865 A1 | 9/2009 | Fukui et al. | |
| 2010/0007165 A1 | 1/2010 | Kusanagi et al. | |
| 2010/0019546 A1 | 1/2010 | Stephens | |
| 2010/0244513 A1 | 9/2010 | Fukui et al. | |
| 2010/0283303 A1 | 11/2010 | Alfredsson et al. | |

* cited by examiner

ARTICULATED SEATING SYSTEM

PRIORITY CLAIM AND CROSS-REFERENCE TO RELATED APPLICATIONS

This application claims priority to and the benefit of the following prior filed copending application:

U.S. Ser. No. 61/556,214 filed Nov. 5, 2011, entitled ARTICULATED SEATING SYSTEM. The entire disclosure of that application (including any appendices) is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to apparatus, systems, methods, techniques, etc. for implementing seating systems that permit movement of a passenger or driver in a vehicle from an interior seat position (e.g., a driving position behind the motor vehicle steering wheel, or a passenger seat position) to an access position outside the motor vehicle, typically in a position that permits easy mounting and dismounting of the seat for someone of limited physical ability (e.g., older individuals, physically challenged individuals, etc.).

2. Description of Related Art

Motor vehicles can have seats and/or seating systems (referred to collectively at time herein as "seating systems") either originally installed or retrofitted to address mobility and other issues for drivers and passengers. Some of these seating systems are powered in the sense that one or more electric motors, actuators and/or the like are used to move one or more components of a given seating system. Previous seating systems have been limited in several ways. In some such systems, the clearance required between the motor vehicle steering wheel and the nearest motor vehicle B-pillar has been more than 24 inches. This space requirement for installation of such systems has thus limited their use to only large vehicles that have sufficient clearance to permit such operation on the driver's side of the interior cabin or compartment. Moreover, earlier powered systems have been configured in a way that prevents use of the motor vehicle in the event that the seating system fails. That is, especially for seating systems on the driver's side, when a seating system motor fails, the motor vehicle becomes inoperable unless the failure occurred while the seat was in its "driving position" (meaning locked into position to permit safe operation of the motor vehicle by the driver sitting in the inoperable powered seating system). Finally, the mechanisms used to raise and lower the vertical position of the seat of such seating systems have been limited in their operation and construction. Apparatus, systems, methods, techniques, etc. that provide improved seating systems, especially as implemented in a driver's seat position in a motor vehicle, would represent a significant advancement in the art.

SUMMARY

The present invention is readily understood by the following detailed description in conjunction with the accompanying drawings. Embodiments of an articulated seating system include assemblies supporting a user seat—e.g., some embodiments include a mounting assembly, a fore-aft slide assembly, a swivel assembly and an extension assembly, which are driven and/or powered by a drive packet that can include one or more motors, engines, actuators or the like for causing components, assemblies, etc. to move relative to one another. The user seat is moved from a secured "drive position" or other standard interior motor vehicle seat position to an "extension position" (in which the user seat may be completely or substantially inside the motor vehicle but facing outward), and finally to an "access position" outside the motor vehicle, facilitating access for a user having limited mobility, strength, etc. Extension of the user seat from the extension position to the access position can include vertical movement of the user seat and the final access position outside the motor vehicle can be lower than the drive position, the same vertical height, or higher than the drive position, as desired. Some embodiments of the articulated seating system can be used in motor vehicles where a transition corridor of less than 20 inches is present between the motor vehicle steering wheel and the B-pillar. Moreover, some embodiments of the articulated seating system include the use of motors to drive and control one or more of the above-referenced assemblies, wherein the motor(s) can be operated manually in situations where there is a power failure and/or other failure that prevents powered operation of the articulated seating system, thus allowing securing of the user seat in a position that permits continued use of the motor vehicle despite the articulated seating system power and/or other failure. Finally, embodiments of the articulated seating system utilize extension guide rollers (fixed to an over-plate) that engage inclinable supporting arms as they move (including support arm pivot mountings to a extension assembly slide mechanism, also referred to as an inner carriage or the like), so that the interval between each extension guide roller and its associated support arm's pivot mounting changes constantly as the arm is extended or retracted. This creates a different leverage arrangement than is possible with earlier systems. Small adjustments are thus easily accomplished when the support arms are still substantially retracted, allowing for minor height adjustments in the user seat position for clearing a door opening, door sill or other structure, or the like during the early portion of seat travel from an extension position inside the motor vehicle to an access position outside the motor vehicle.

BRIEF DESCRIPTION OF THE DRAWINGS

Embodiments of the present invention will be readily understood by the following detailed description in conjunction with the accompanying drawings, wherein like reference numerals designate like structural elements, and in which:

FIG. 2a is a detailed view of the ends of a drive shaft in one or more embodiments of an articulated seating system.

DETAILED DESCRIPTION

Figure 1:
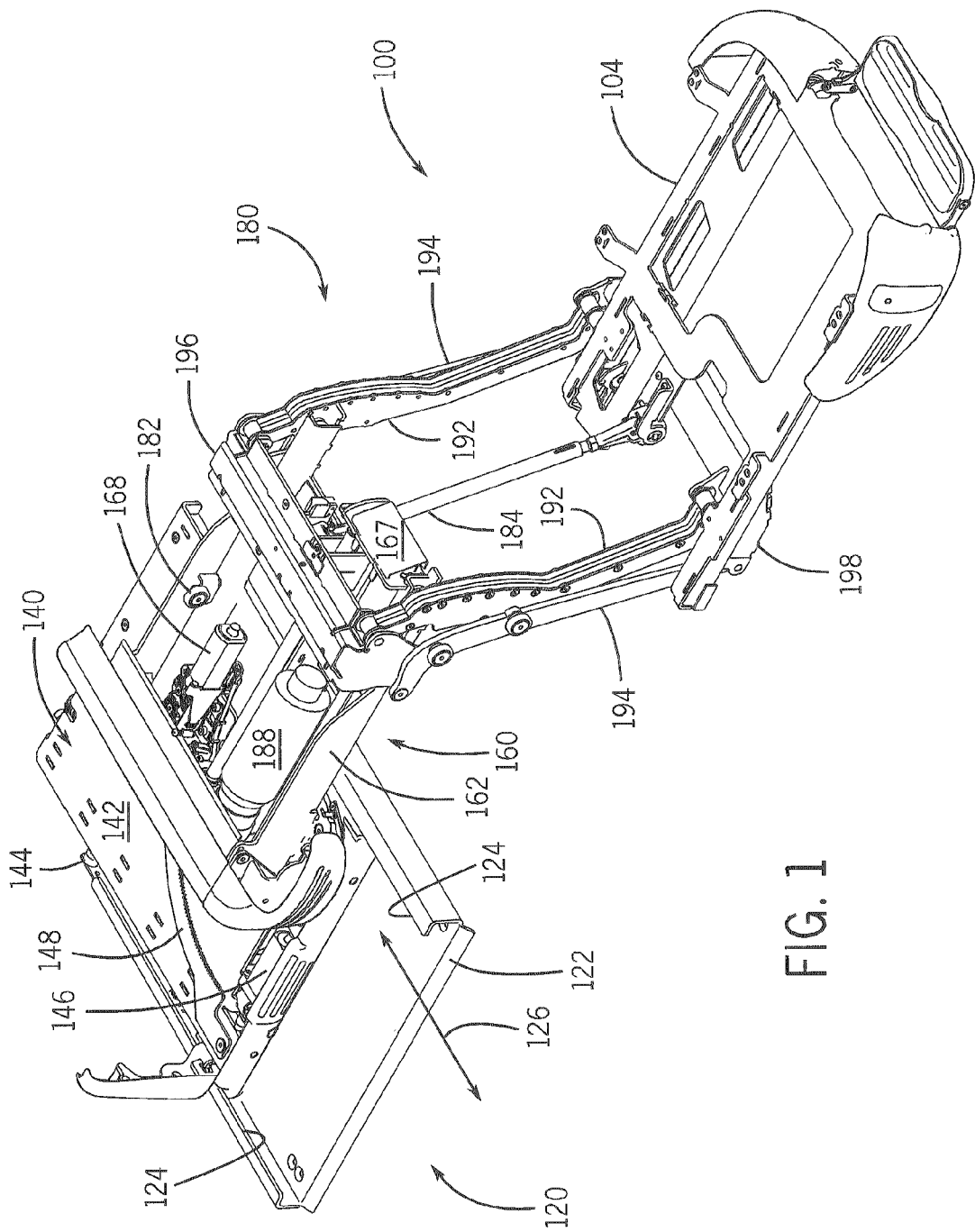
FIG. 1 is an isometric view of one or more embodiments of an articulated seating system.

The following detailed description of the invention, including the Figures, will refer to one or more invention embodiments, but is not limited to such embodiments. Rather, the detailed description is intended only to be illustrative. Those skilled in the art will readily appreciate that the detailed description given with respect to the Figures is provided for explanatory purposes as the invention extends beyond such specific embodiments. Embodiments of the invention provide apparatus, systems, methods, techniques, etc. including and pertaining to (but not limited to) articulated seating systems for and/or in motor vehicles and the like, including articulated seating systems that are suited for motor vehicles having a spacing (referred to as a "transition corridor") between the steering wheel and nearest B-pillar of 18 to 22 inches. Other structures and uses will be apparent to those skilled in the art after considering the following disclosure and the Figures provided herewith. Some embodiments will be shown and explained in connection with a driver's side seating system secured to the interior of a motor vehicle. Some embodiments can be used in connection with other seating positions (e.g., passenger seating positions) in a motor vehicle or the like.

The Figures illustrate one or more embodiments of an articulated seating system 100. Some such embodiments can be viewed as a number of assemblies supporting a seat bracket 104 and associated mounted user seat 102—e.g., a mounting assembly 120, a fore-aft slide assembly 140, a swivel assembly 160 and an extension assembly 180, which are driven and/or powered by a drive packet that can include one or more motors, engines, actuators or the like for causing components, assemblies, etc. to move relative to one another.

Fore-aft slide assembly 140 is configured to move user seat 102 linearly forward and backward relative to the mounting assembly 120 and relative to the front and back of a motor vehicle 70 in which system 100 is mounted. As explained in more detail below and illustrated in one or more of the Figures, some embodiments use a slider mechanism to enable this fore-aft slide assembly 140 movement.

Swivel assembly 160 is configured to rotate user seat 102 relative to the fore-aft slide assembly 140 in some embodiments, rotating user seat 102 (using incremental or continuous motion) between 90° and 180° relative to the direction of linear fore and aft movement (shown in FIG. 1 as arrow 126), and in some embodiments rotating user seat 102 about 105° to 115°. In some embodiments the swivel assembly 160 works in concert with the fore-aft slide assembly 140 and/or the extension assembly 180 (e.g., through combined user seat movement by the fore-aft slide assembly 140 and the swivel assembly 160, or alternatively through combined user seat movement by the fore-aft slide assembly 140, the swivel assembly 160 and the extension assembly 180 in some embodiments) to permit movement of the user seat 102 through a "transition corridor" within a motor vehicle from a "drive position" inside the motor vehicle (in some embodiments the drive position allows the occupant of articulated seating system 100 to be the motor vehicle's driver) to an "extension position" where the user seat 102 is positioned so that it can be extended outwardly (i.e., to the exterior of a motor vehicle) to an "access position" outside the motor vehicle (including embodiments where such movement from the drive position to the extension position through the transition corridor can be performed within a motor vehicle that has a transition corridor that is less than 20 inches and, in some embodiments is as small as 18 inches or less), embodiments of which are explained in more detail below.

The extension assembly 180 is configured to move a user seat 102 mounted as part of articulated seating system 100 between the extension position, in which the user seat 102 may be at least partially inside the motor vehicle, and the access position outside the motor vehicle, which typically is vertically lower than the drive position or is arrived at using vertical movement of the user seat 102 during movement between the extension position and the access position (although the access position's vertical height an be at the same vertical level or higher, if desired, by configuring the underside channel 185 in each support arm 192, as described in more detail below).

Figure 2:
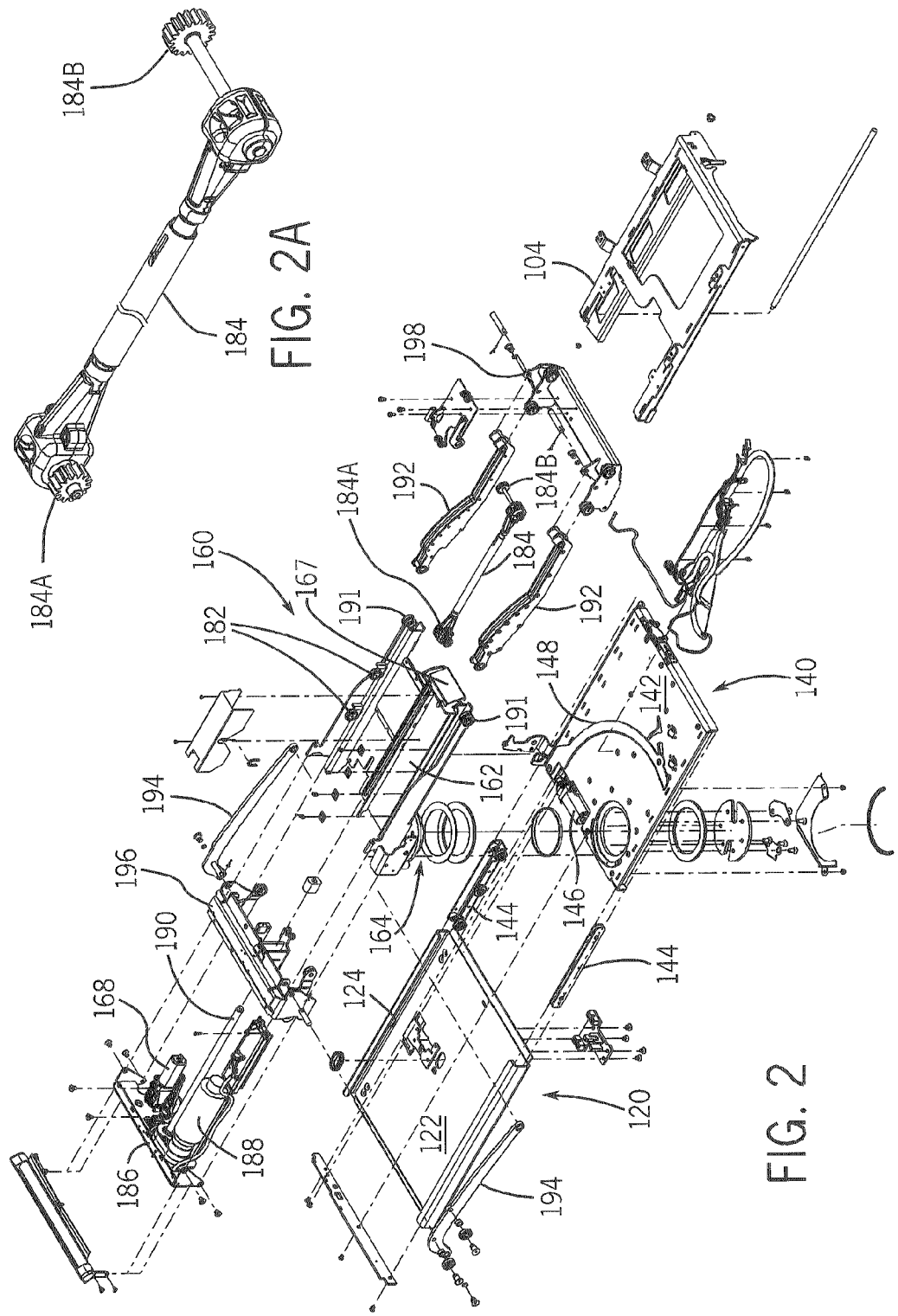
FIG. 2 is an exploded view of a portion of the articulated seating system of one or more embodiments of an articulated seating system.

As seen in FIGS. 1 and 2, mounting assembly 120 comprises a generally planar adapter plate 122 that is bolted or otherwise affixed to the motor vehicle, for example being bolted to the motor vehicle chassis or other appropriate attachment point(s) or structure(s). Adapter plate 122 has lateral sidewall channels 124 configured to allow and guide the fore-aft slide assembly 140 to move linearly fore and aft relative to the motor vehicle, as indicated by arrow 126.

Figure 3:
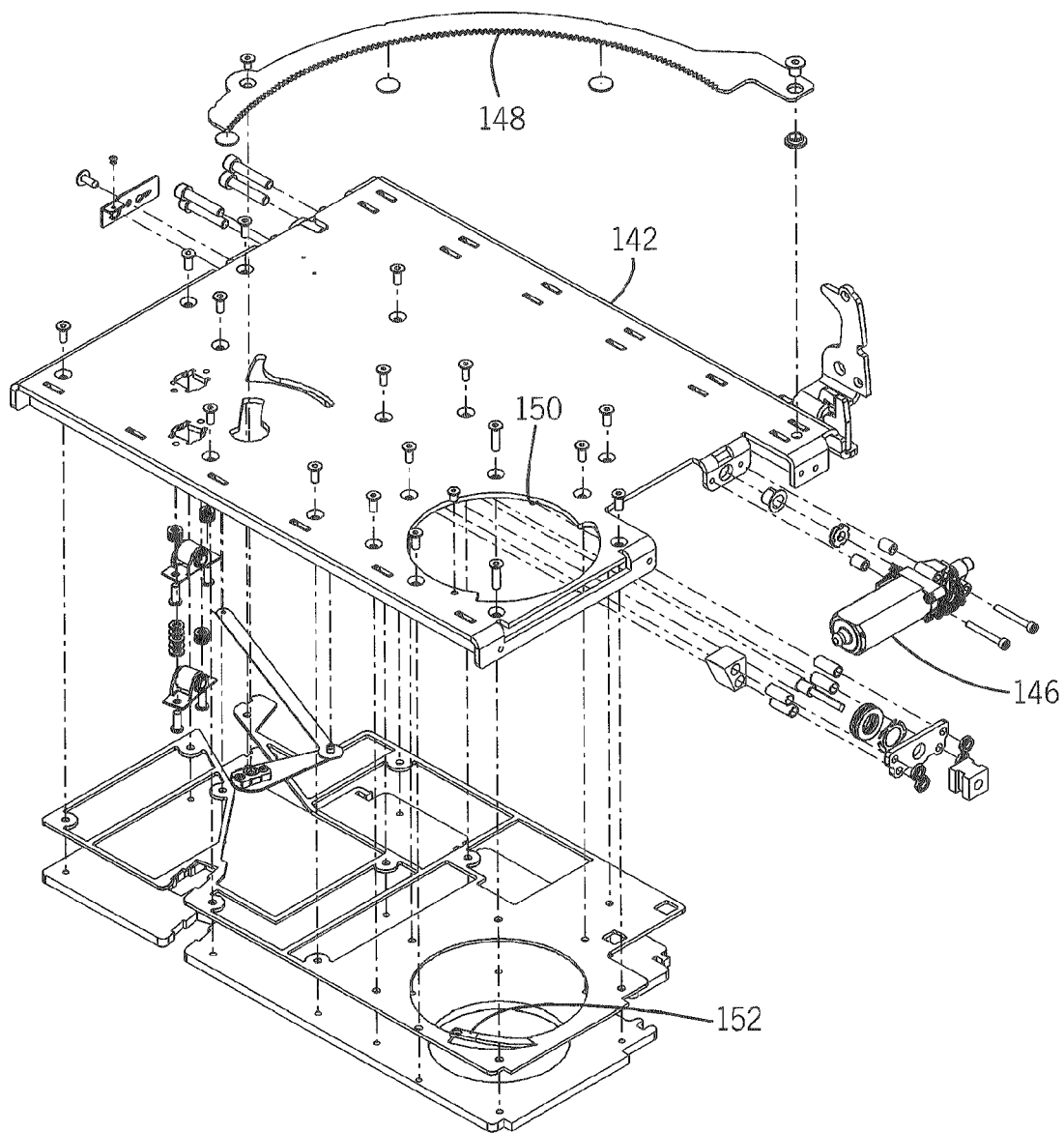
FIG. 3 is an exploded view of a portion of a fore-aft slide assembly of one or more embodiments of an articulated seating system.

As seen in FIGS. 2 and 3, the fore-aft slide assembly 140 comprises a generally planar under-plate 142 having slide rollers 144 engaging sidewalls 124 to guide under-plate 142 as it moves fore and aft during operation. Under-plate 142 can be a unitary component or can be composed of a number of plates sandwiched to provide needed structure and/or support for system 100 and fore-aft slide assembly 140. Other equivalent sliding or linear motion structures may be known to those skilled in the art. Movement is controlled by a slide motor 146 mounted to under-plate 142. An arcuate rack and pinion configuration or other appropriate swivel mechanism can be used to control rotation of swivel assembly 160 relative to fore-aft slide assembly 140 in some embodiments. To accomplish this, an arcuate rack 148 is mounted to under-plate 142, a swivel or pivot hole 150 being situated generally concentric to rack 148. Hole 150 holds and/or supports a swivel post or similar structure of swivel assembly 160 during movement from the drive position to the extension position, as explained in more detail below.

Figure 4:
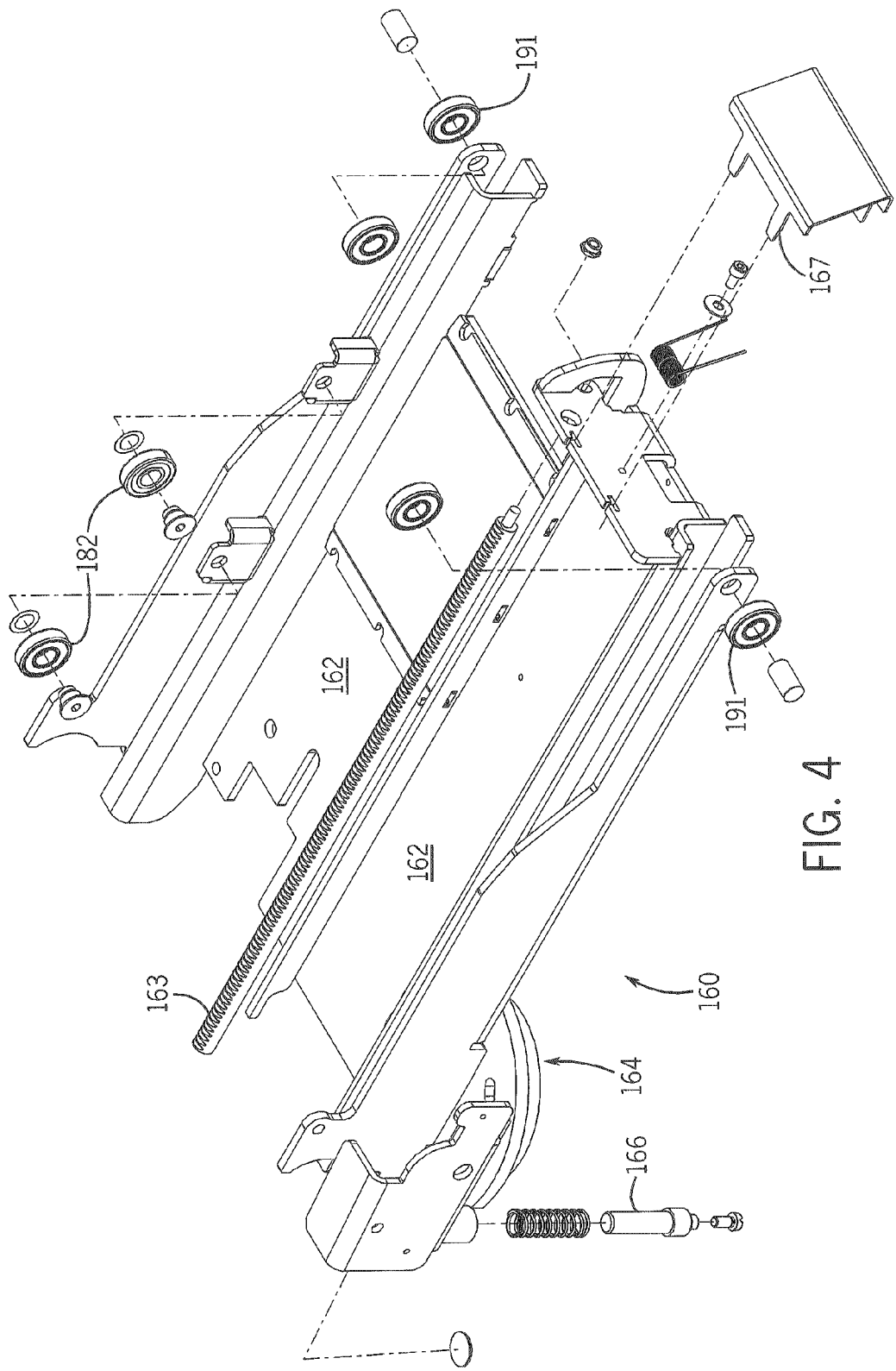
FIGS. 4, 5A, 5B, 5C and 5D are various views of a portion of the swivel assembly of one or more embodiments of an articulated seating system.
Figure 5:
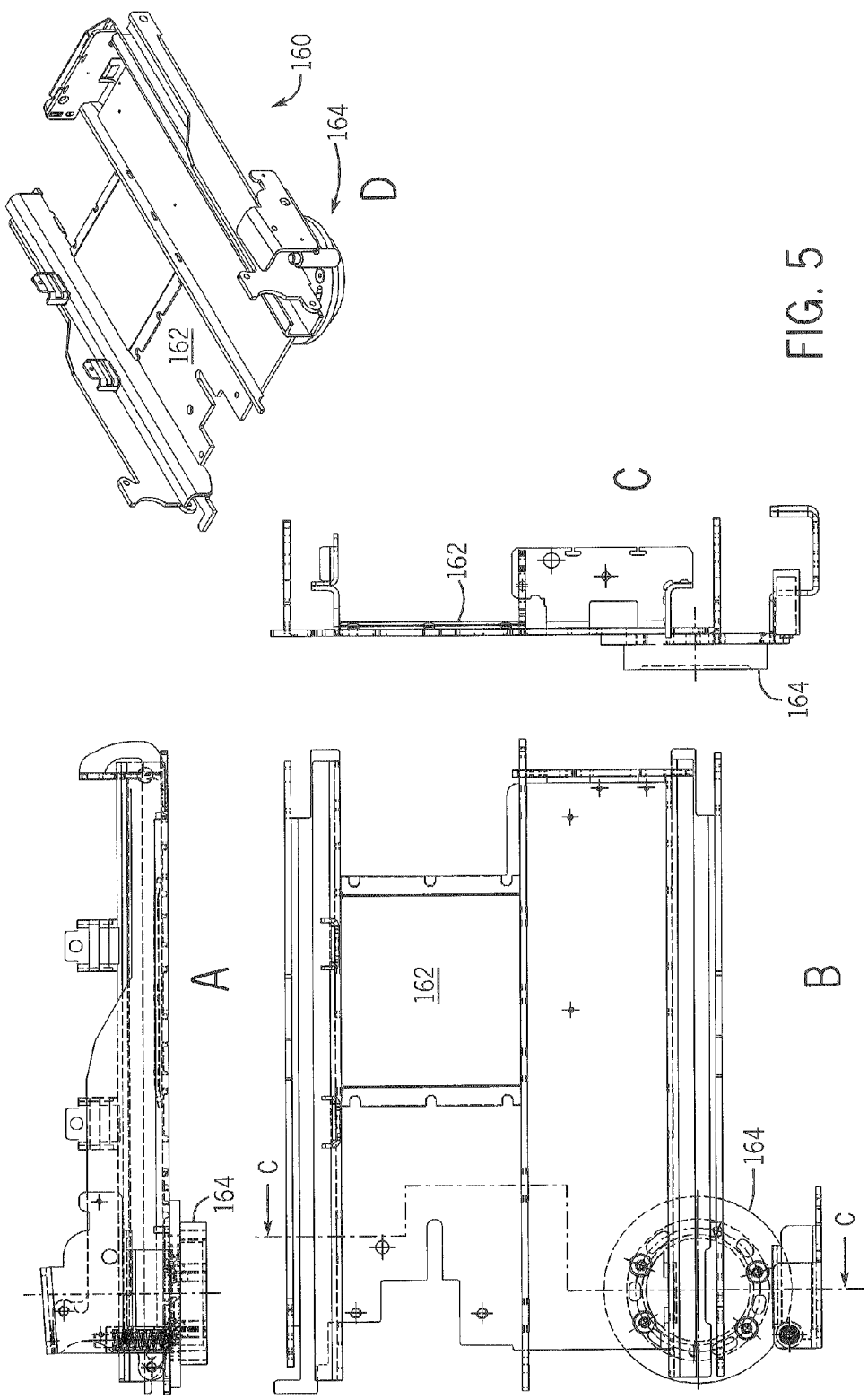

Swivel assembly 160 is mounted atop fore-aft slide assembly 140 and is configured to rotate relative to the fore-aft slide assembly 140 using an off-center swivel assembly in some embodiments. Swivel assembly 160 has an over-plate 162 that can include and/or be mounted to a weldment or the like, depending upon the configuration used for a given articulated seating system 100. As seen in FIGS. 1, 2, 4 and 5, over-plate 162 has a swivel post or other similar structure 164 mounted to the underside of over-plate 162. Structure 164 engages hole 150 of under-plate 142 to permit controlled rotation of the swivel assembly 160 relative to the fore-aft slide assembly 140. Part of extension assembly 180 is mounted to over-plate 162 in some embodiments. For example, as seen in FIGS. 1, 2 and 4, a number of extension guide rollers 182, 191 are mounted to over-plate 162, as explained in more detail below. Moreover, a linear rack 163 that is part of a drive shaft mechanism can be mounted to over-plate 162 as well, as explained in more detail below, and can be used in operating the extension assembly 180 to move a user seat 102 from the extension position to the access position, and vice versa, as desired.

A swivel motor 168 (also referred to as a rotation motor) having a pinion 169 coupled thereto is mounted to over-plate 162 so that pinion 169 engages arcuate rack 148 on under-plate 142. This swivel motor 168 can be mounted to over-plate 162 using a back weldment 186 or other appropriate structure. Back weldment 186 also can be used to mount an extension motor 188 (also referred to as a lift motor) having a lift screw 190 engaging a tab 193 on inner carriage 196 to control extension and retraction of the user seat 102. As described in more detail below, movement of inner carriage 196 allows an upper end gear connection 184A of drive shaft 184 and rack 163 to synchronize movement of the inner carriage 196 with the extension (and any vertical movement) of the user seat 102 via a geared connection between the lower end 184B of the drive shaft 184 and outer carriage 198. That is, in some embodiments the pivotable coupling of the drive shaft inner end uses a geared coupling to the linear rack 163 and the pivotable coupling of the drive shaft outer end uses a end geared coupling to the outer carriage 198 to synchronize the angular movement of the drive shaft 184 relative to the over-plate 162 with the angular movement of the user seat 102 relative to the drive shaft 184.

Figure 6:
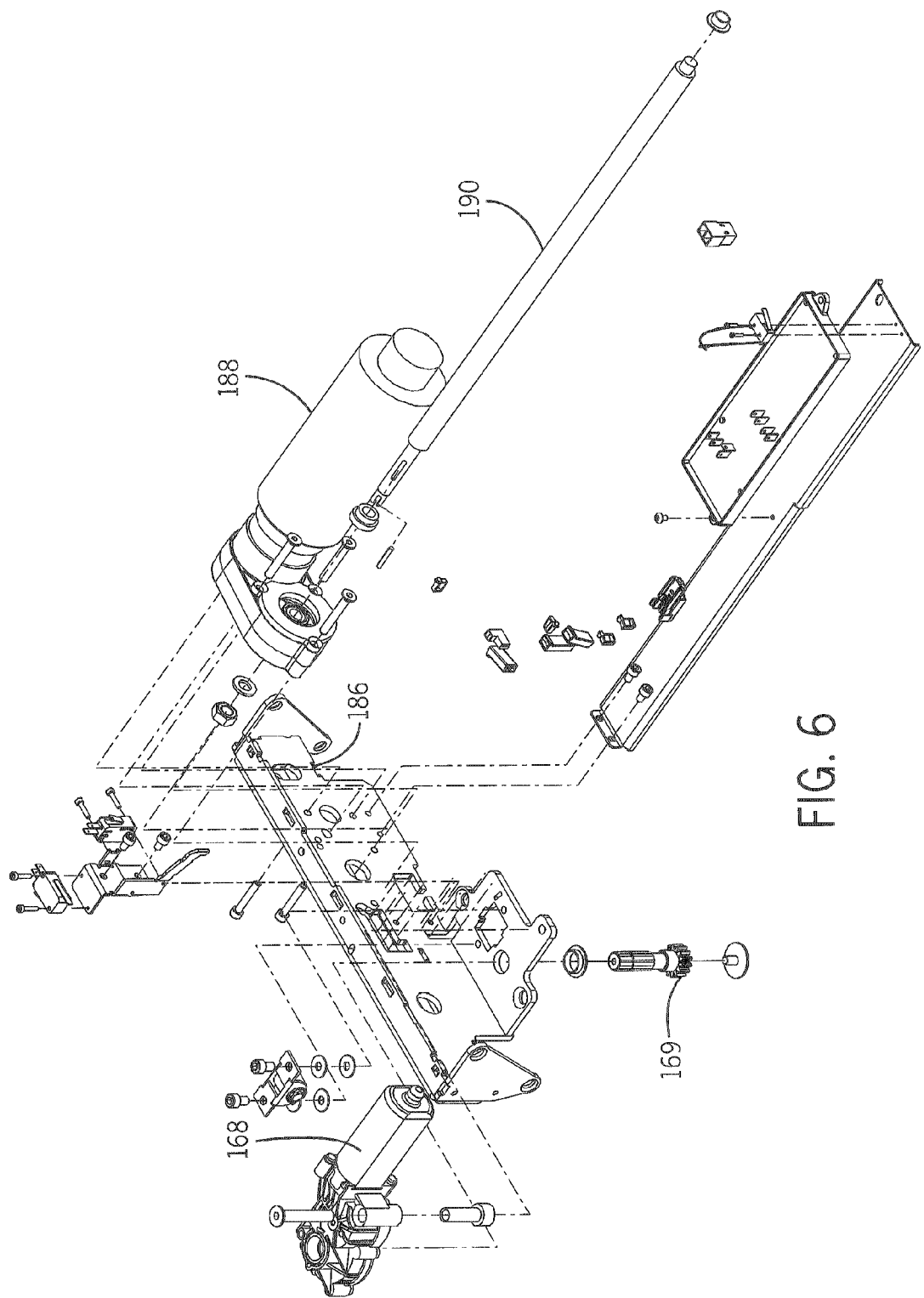
FIG. 6 is an exploded view of a motor mounting weldment of one or more embodiments of an articulated seating system.

One or more embodiments of the back weldment 186 and motors 168, 188 are shown in FIG. 6. As will be appreciated by those skilled in the art, other equivalent drive packets using more or fewer motors, other components, etc. can be used. The extension assembly 180 can operate after the seat has moved from the drive position to the extension position. In the extension position, the user seat 102 may be partially or completely inside the motor vehicle in some embodiments, but is facing generally outward through a motor vehicle access-way (e.g., a door). In some embodiments the extension assembly 180 is configured to move the user seat 102 generally laterally (and perhaps a bit rearward relative to the motor vehicle) out of the motor vehicle through the access-way as well as lowering the user seat 102 to a level that makes mounting and dismounting the user seat 102 easier for individuals who have limited mobility; vertical movement of the user seat 102 using extension assembly 180 also can be used to vertically move the user seat 102 around and/or past obstructions.

As shown in some of the Figures, after the swivel assembly 160 of articulated seating system 100 has been rotated to its extension position (i.e., between 90° and 180° outboard from a forward-facing orientation in a motor vehicle, for example) by swivel motor 168 and arcuate rack (or gear ring) 148, articulated seating system 100 uses extension motor 188 to control the extension assembly 180 for extension and retraction (and thus lowering and raising, respectively, as configured) of user seat 102.

Figure 7:
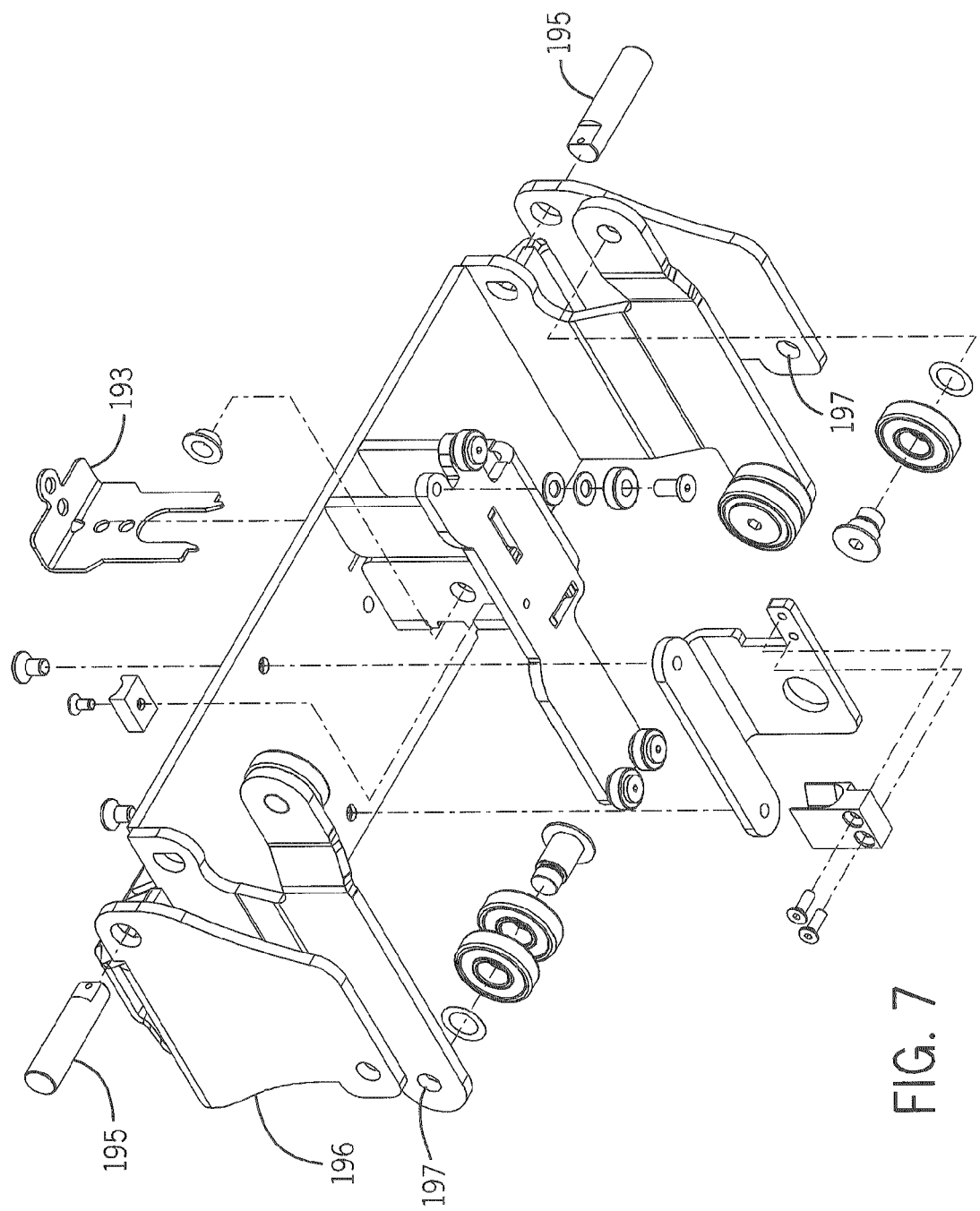
FIG. 7 is an exploded view of an inner extension carriage of one or more embodiments of an articulated seating system.
Figure 8:
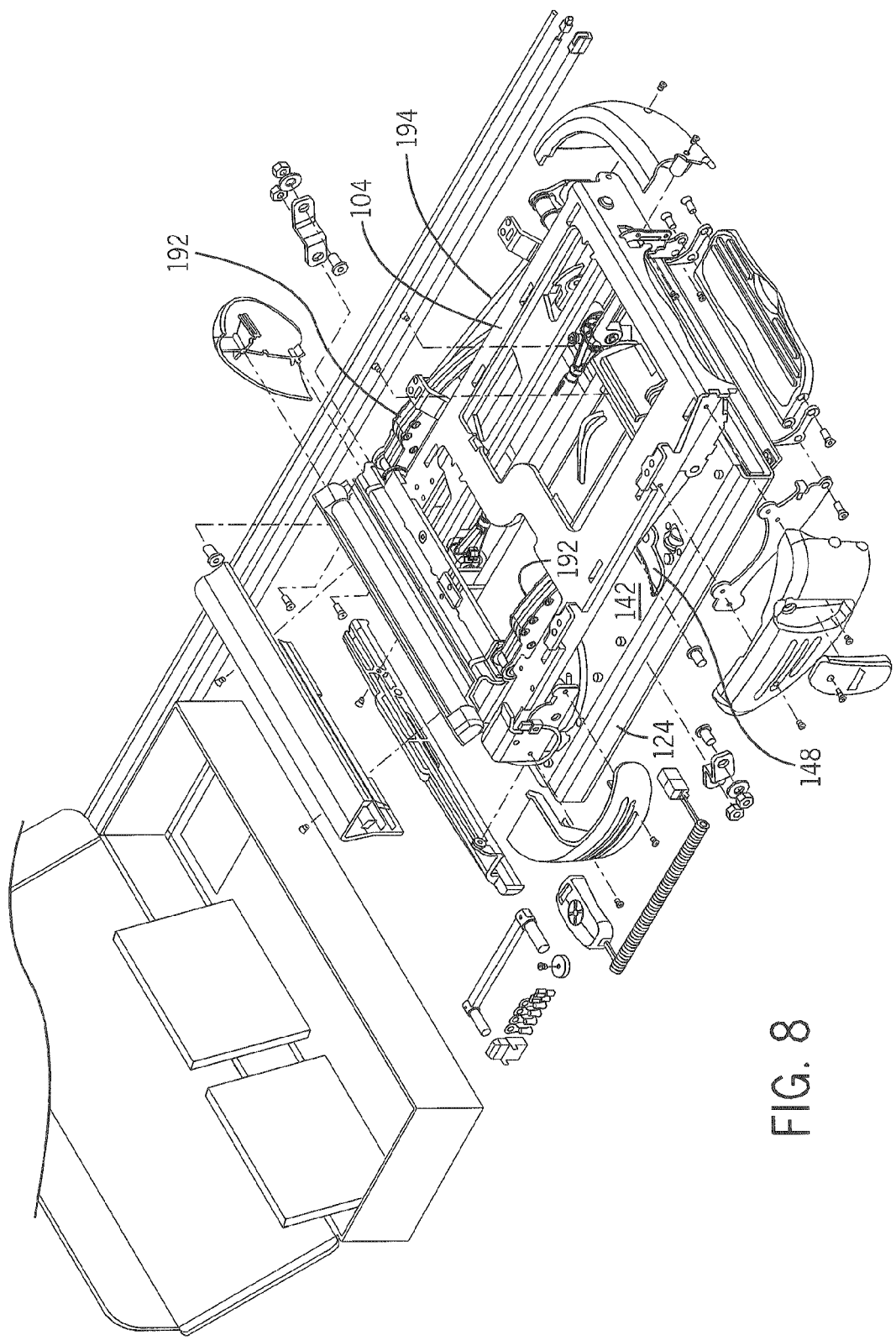
FIG. 8 is a partially exploded view of a portion of one or more embodiments of an articulated seating system.
Figure 9:
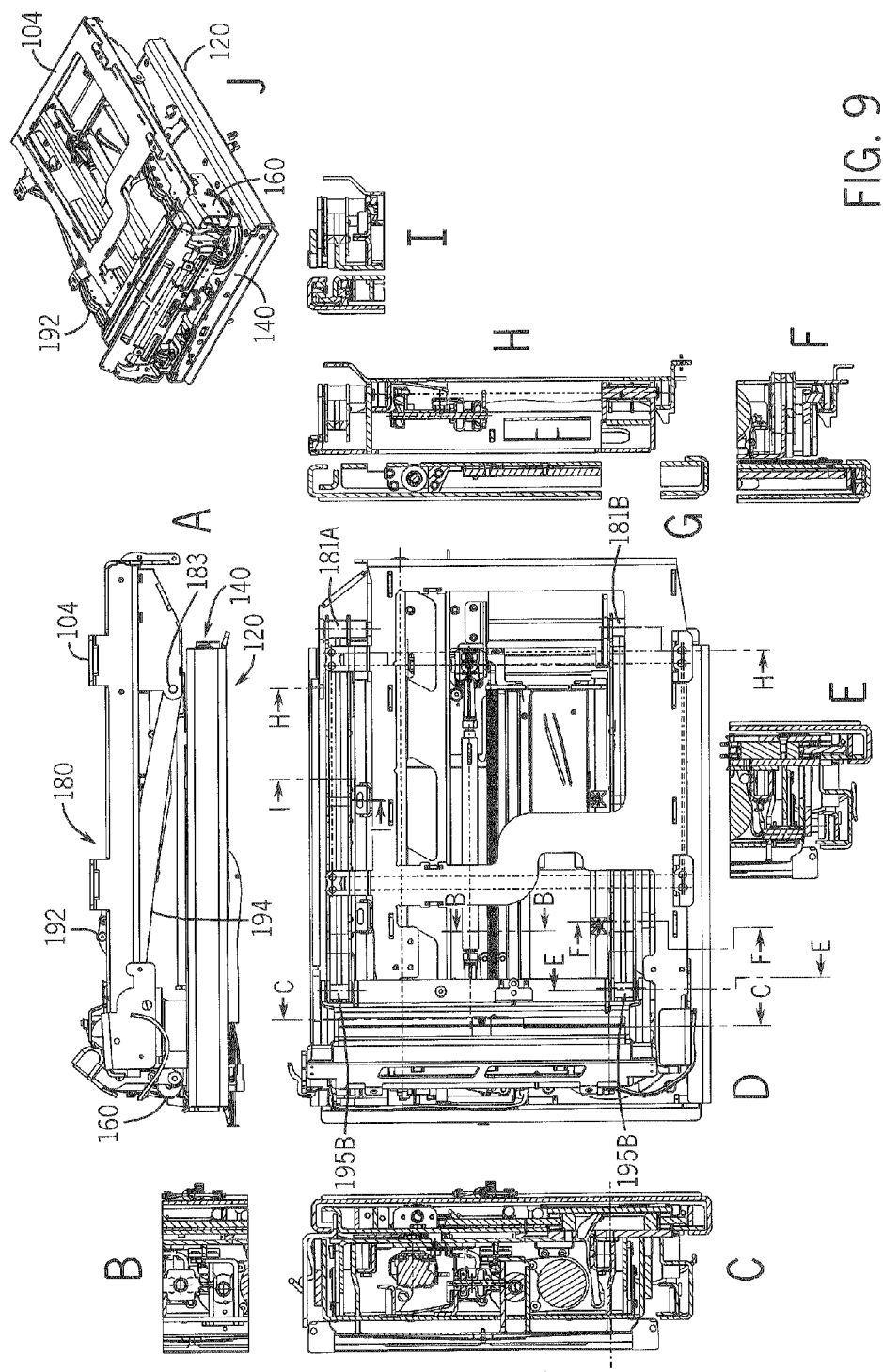
FIGS. 9A, 9B, 9C, 9D, 9E, 9F, 9G, 9H, 9I and 9J are various views of one or more embodiments of an articulated seating system.
Figure 10:
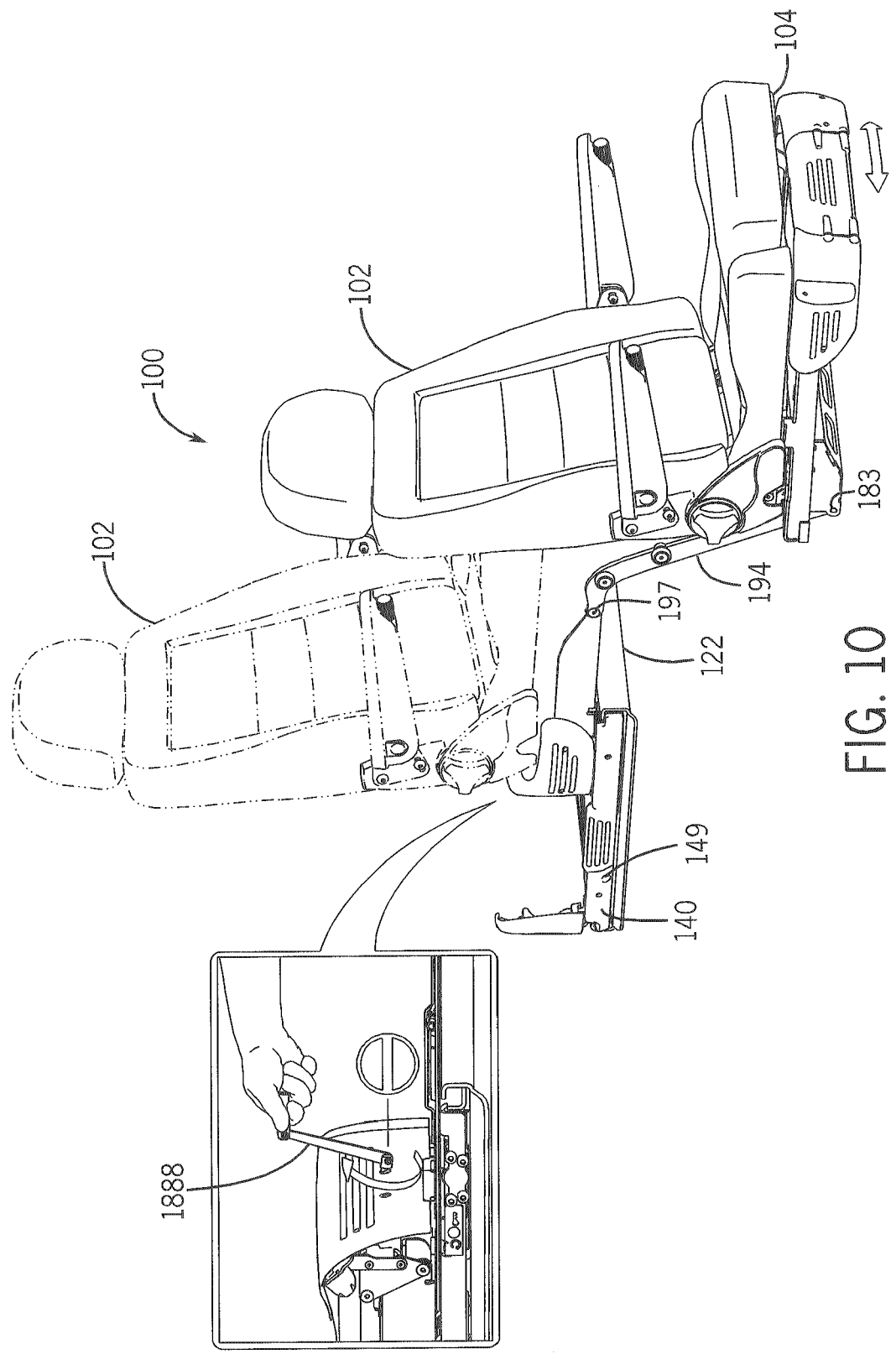
FIG. 10 is a perspective view of a user seat being lowered, including an inset showing manual operation of a motor.
Figure 11:
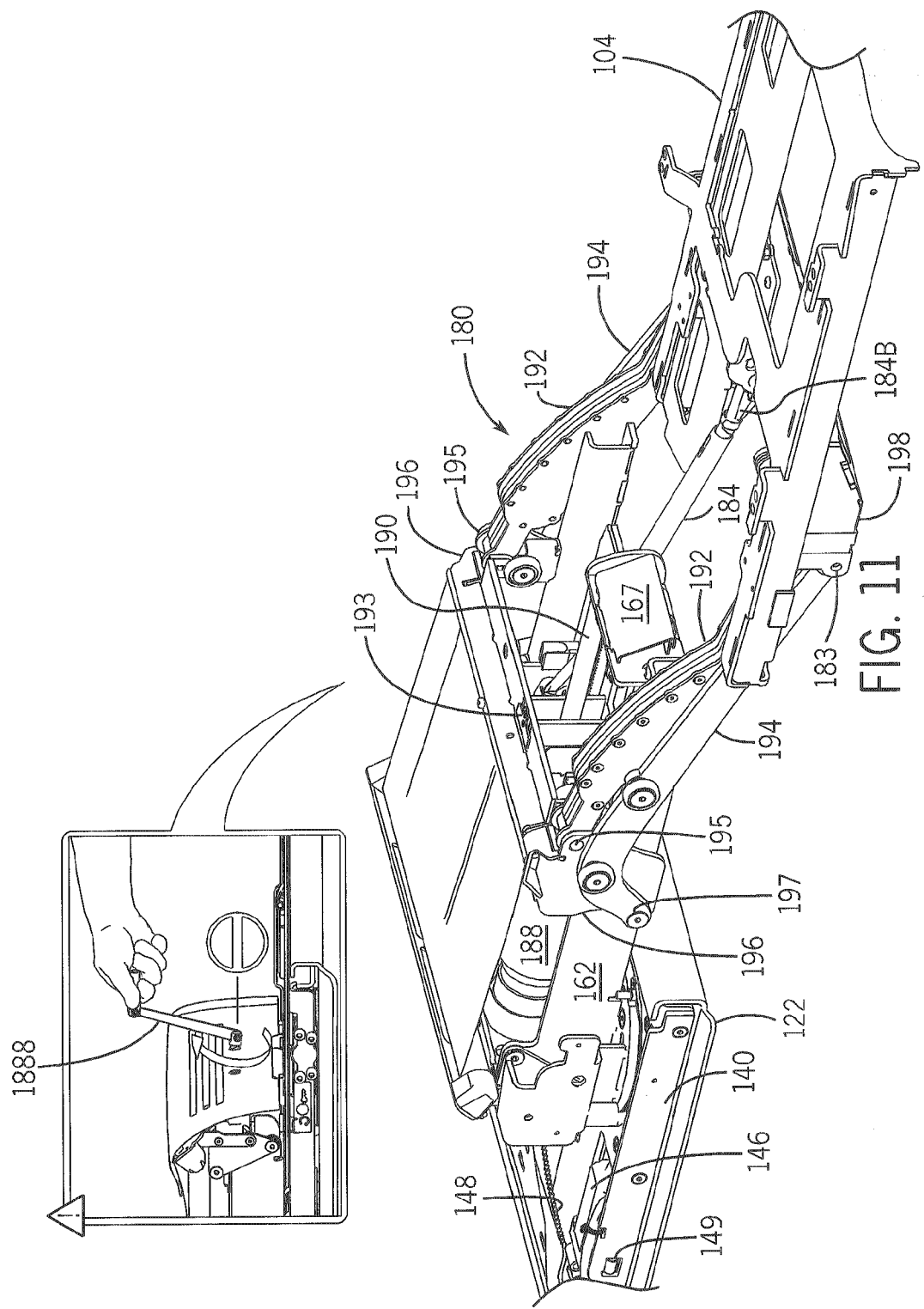
FIG. 11 is a perspective view of a partially extended seat and an inset showing manual operation of a motor.

User seat 102 is mounted to a chair plate 104 coupled to extension assembly 180, as seen in FIGS. 1 and 10. An inner slide mechanism 196 (also shown in detail in FIG. 7) can be a carriage or the like that is extended and retracted using extension motor 188, lift screw 190 and tab 193. The inner ends of support arms 192 and push-rods 194 are pivotably mounted to inner slide mechanism 196 at pivots 195 and 197, respectively, while the outer ends of support arms 192 and push-rods 194 are pivotably mounted to an outer carriage 198 at pivots 181 and 183, respectively. Outer carriage 198 can also be pivotably coupled to chair plate 104. Chair plate 104 is extended and retracted using a drive shaft 184 driven by extension motor 188. Drive shaft 184 is pivotably mounted at its "inner end" 184A to the inner carriage 196 and at its "outer end" 184B to the outer carriage 198. In some embodiments, as seen in FIG. 2A, these pivotable connections at 184A and 184B use gears or other structure to better control the pivoting of the drive shaft 184 and chair plate 104 during extension and retraction of the user seat 102. Such geared connections and the resulting synchronization also assist in returning the user seat 102 to a drive position in the even of motor or other failure so that the user seat 102 can be secured to allow full use of the motor vehicle in which system 100 is installed. When fully rotated outward and retracted in its extension position, as seen in FIG. 20D and other Figures, chair plate 104 is positioned above and substantially supported by the mounting assembly 120, fore-aft slide assembly 140, swivel assembly 160, extension assembly 180 and their associated structures.

From the extension position, the lift screw of extension motor 188 drives the tab 193 of inner carriage 196 and thus drive shaft 184 to push chair plate 104 and user seat 102 out of the motor vehicle or, from the access position, to pull the chair plate 104 and user seat 102 into the motor vehicle. In some embodiments a spring-loaded stop pin 166 can be used to prevent operation of the extension assembly 180 until the user seat 102 has been rotated sufficiently (e.g., away from a steering wheel or other structure). Stop pin 166 rides on a three-dimensional cam 152 (also referred to as a "limit tab") adjacent hole 150, seen in FIGS. 3 and 4, and locks extension assembly 180 to prevent operation until the swivel assembly 160 has rotated user seat 102 a preselected angular amount (e.g.,) 45°. A backrest stop plate 167 also can be affixed to over-plate 162. Earlier systems that used a vertical lift mechanism mounted behind the user seat suffered from limitations on the interior dimensions of motor vehicles in which such earlier systems could be used. The large lift mechanism mounted to the back of the user seat would have to be moved when the seat was rotated and also increased the "footprint" of the earlier articulated seating system so that a user seat in such earlier systems could not fit through transition corridors in motor vehicles other than very large SUVs, large vans, etc. Embodiments of the articulated seating system 100 disclosed and claimed herein maintain fore-aft slide assembly 140, swivel assembly 160 and extension assembly 180 (which controls vertical movement of the user seat 102) below the user seat 102 until it is finally moved to its access position so that the footprint of embodiments of the articulated seating system 100 is minimized and the articulated seating system 100 can be installed and used in smaller motor vehicles than earlier systems.

Figure 12:
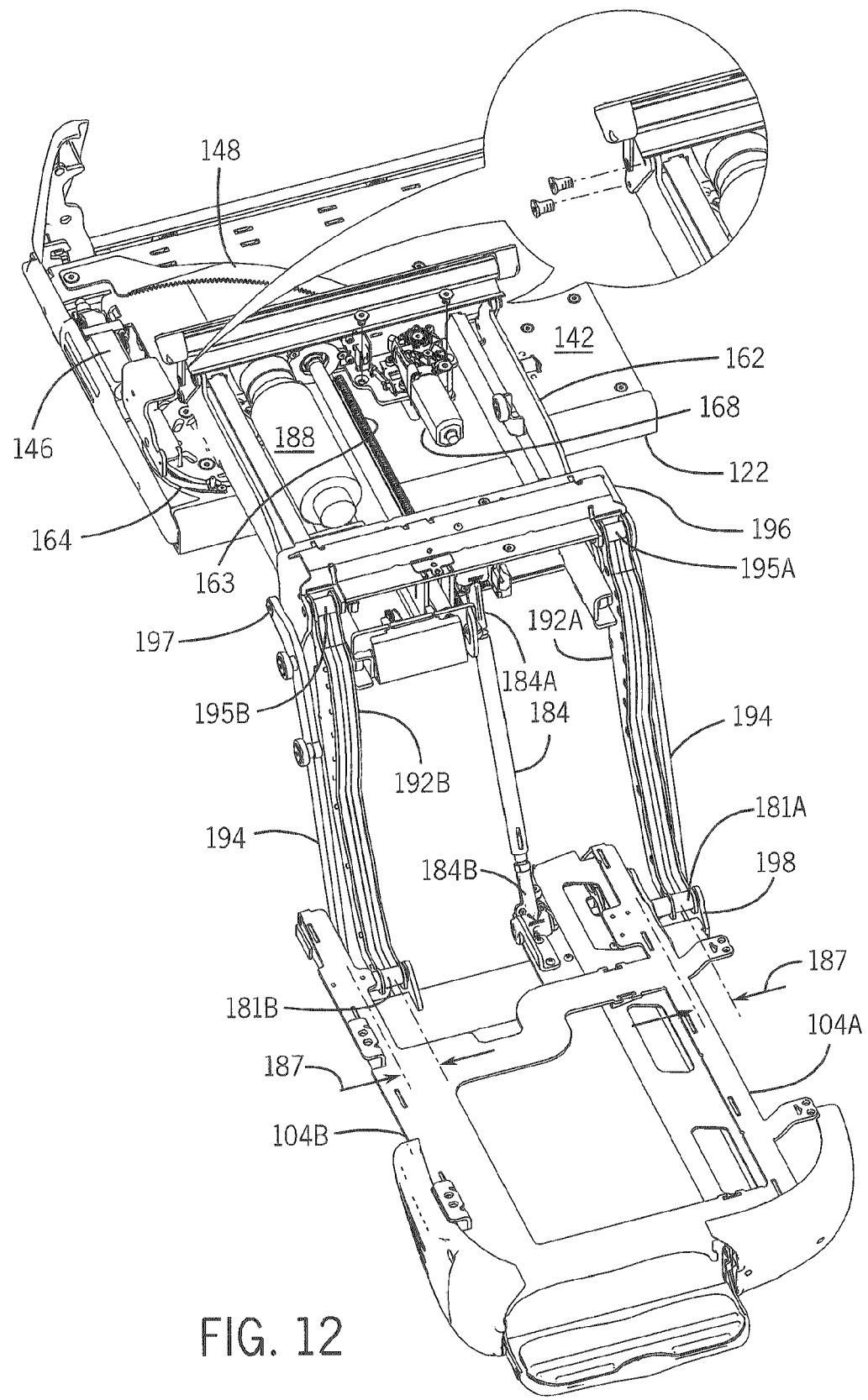
FIG. 12 is a perspective view of one or more embodiments of an articulated seating system.
Figure 13:
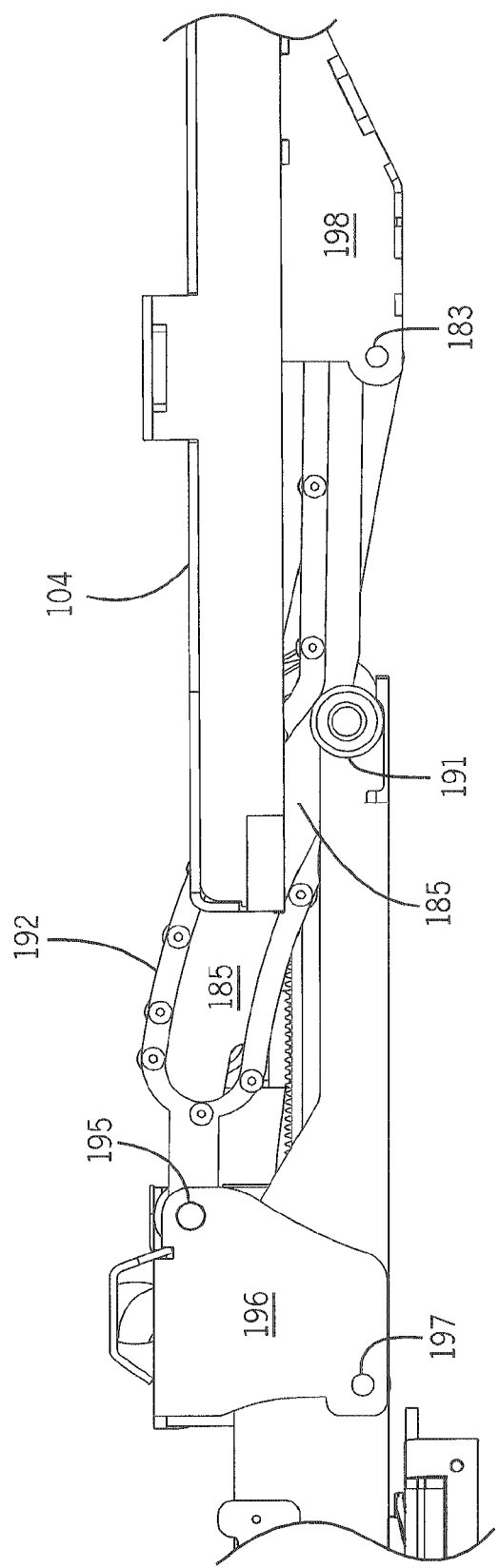
FIGS. 13-16 are sequentially ordered views showing extension of a seat bracket according to one or more embodiments of an articulated seating system.
Figure 14:
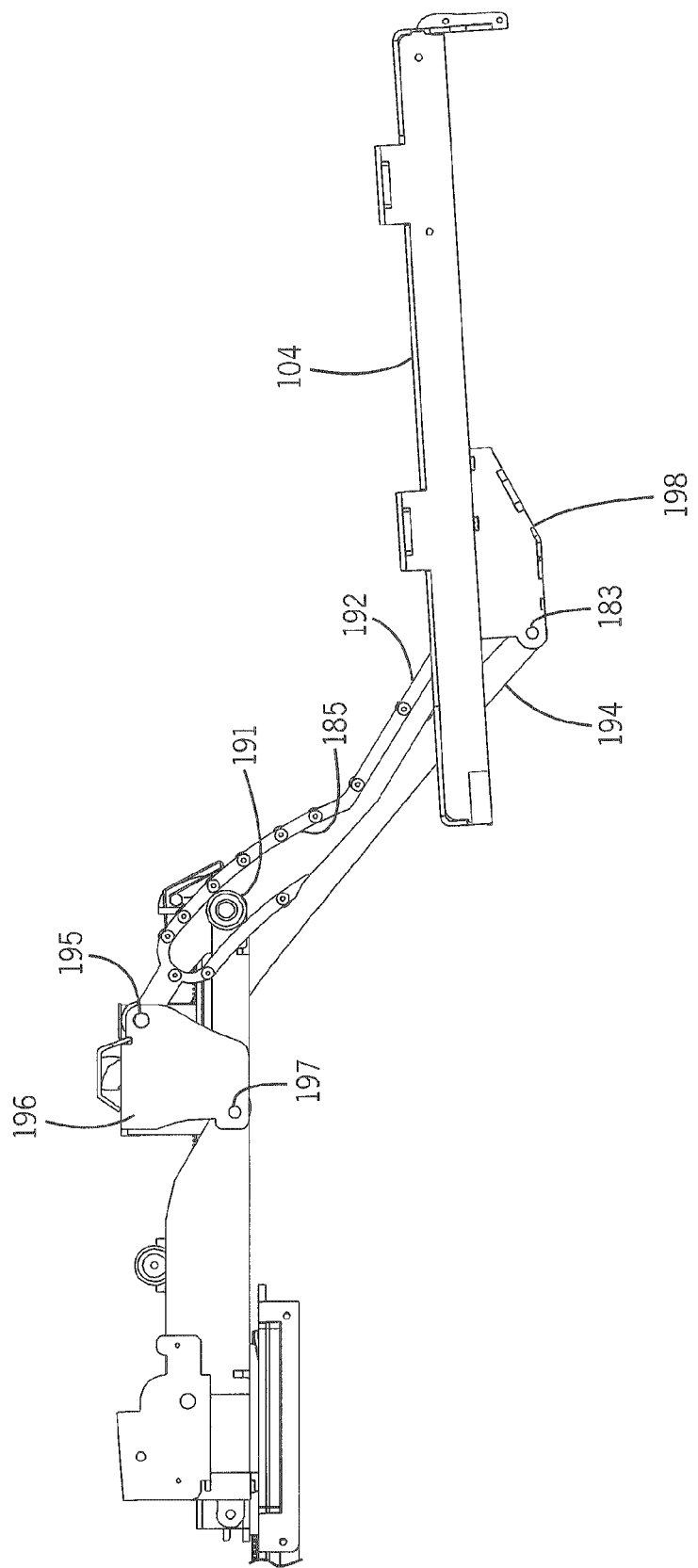
Figure 15:
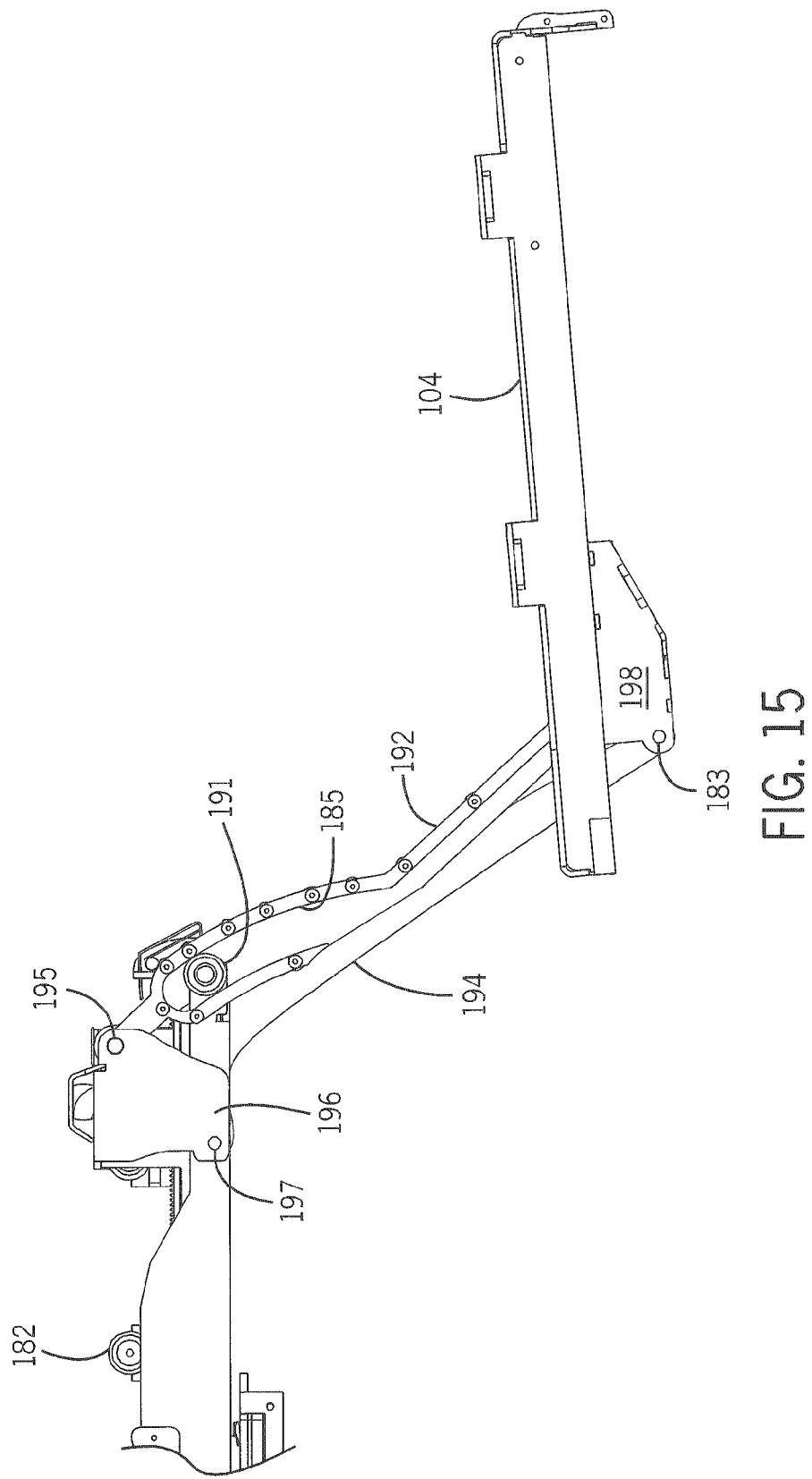
Figure 16:
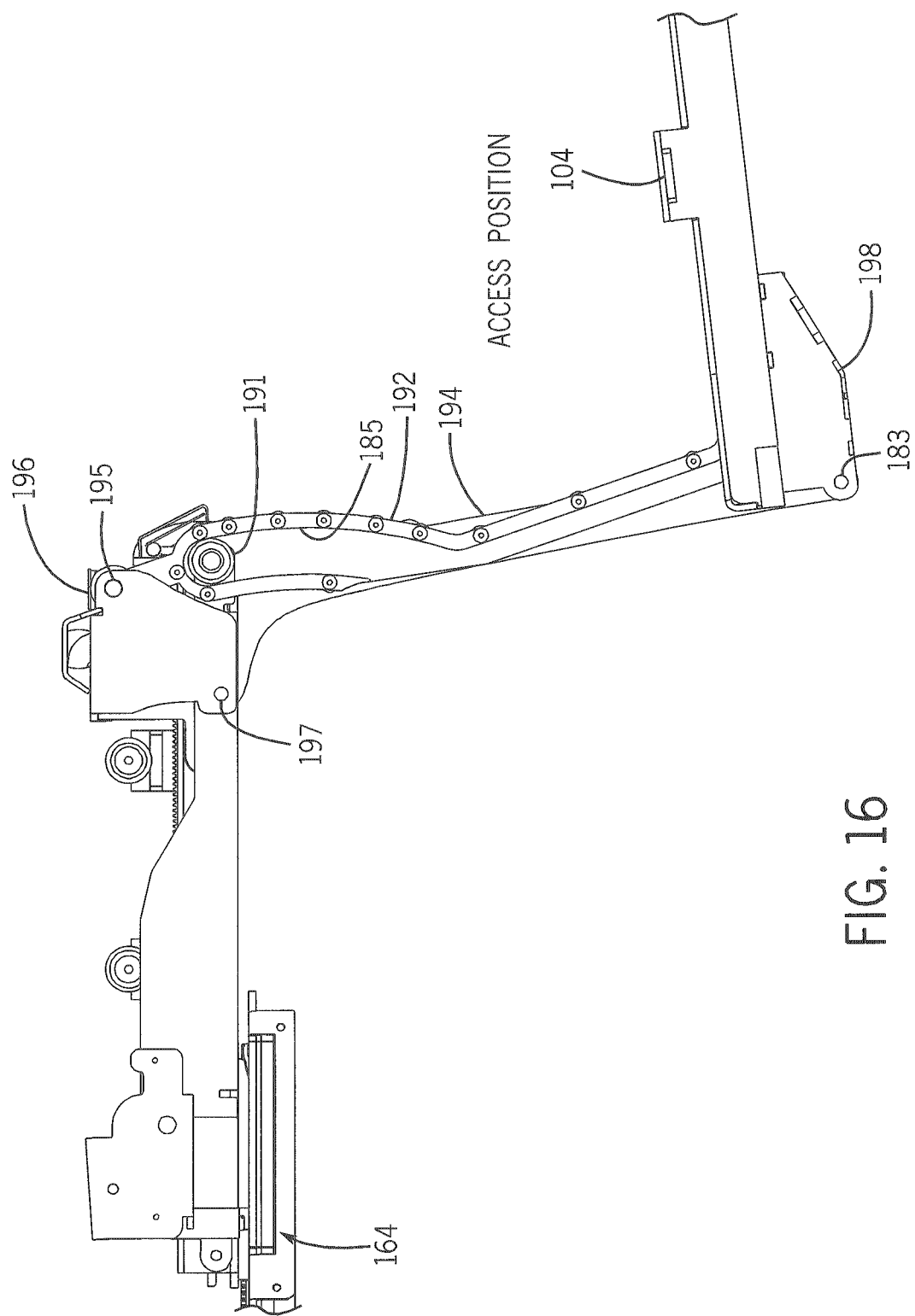

The ability to move the user seat 102 through a relatively narrow transition corridor is further assisted in some embodiments by laterally offsetting the mounting of the user seat 102 relative to the support arms 192 and push-rods 194 to provide additional "clearance" space when moving past structures such as a motor vehicle's B-pillar. As seen in the exemplary embodiment of FIG. 12 (showing an embodiment of system 100 used in a passenger side seat position—for a motor vehicle in the United States, for example), the pivot mountings 181A, 181B of the lower ends of support arms 192A, 192B, respectively (and the pivot mountings 183 of the lower ends of push-rods 194, if desired) are mounted in a lateral offset orientation relative to the chair plate 104 shown by offset spacing arrows 187 in FIG. 12. In FIG. 12 this lateral offset coupling is achieved by having pivot mounting 181A mounted outside one outer edge 104A of chair plate 104, while the pivot mounting 181B of the other support arm 192B (which would be closest to the motor vehicle B-pillar in a passenger seat position) is mounted inside the opposite outer edge 104B of plate 104. This provides some embodiments of the seating system 100 with 1 to 2 inches of additional clearance that allow greater rotation of the user seat 102 during outward movement after it has passed the motor vehicle B-pillar (or other obstructions to rotation).

In some embodiments of the articulated seating system 100, the slide motor 146, swivel motor 168 and extension motor 188 are all manually operable. Manual operation of one or more of these motors is performed by "unlocking" or "releasing" the motor from its powered connections to permit free operation during manual operation. This is particularly helpful when a seating system loses power and/or fails in some way. For a motor vehicle in which the articulated seating system 100 is installed in the driver's location, failure of earlier seating systems other than in a drive position has previously meant that the motor vehicle was unusable. FIG. 10 illustrates one example in which the extension motor 188 can be operated using a hand crank 1888 to move the extension assembly 180 back into the extension position inside a motor vehicle. Embodiments using geared connections at the ends of drive shaft 184 improve this manual operation by ensuring proper synchronization and movement of the components being moved back into their drive position. Similar apparatus can be used to manually operate the swivel motor 168 and the slide motor 146 in the event of a loss of power and/or failure. In FIG. 10 slide motor 146 is accessed using an access hole 149.

Extension assembly 180 uses a unique structure and operation to move user seat 102 from the extension position to the access position in some embodiments. This extension assembly 180 moves user seat 102 in both a generally lateral direction (outward or inward relative to the motor vehicle interior) and a vertical direction using an assembly that is kept underneath user seat 102 when seat 102 is not laterally extended outside the motor vehicle. FIGS. 13-16 illustrate movement of the chair plate 104 as it is extended outward (by drive shaft 184) and downward/upward (by engagement of the guide rollers 191 by support arms 192), wherein an underside channel 185 in each support arm 192 (shown in cross-section in FIGS. 13-16) encloses and engages an extension guide roller 191 that is rotatably mounted at the outer end of over-plate 162 of swivel assembly 160.

FIGS. 13-16, respectively, show sequential lowering and extension of chair plate 104 with internal support channels 185 of support arms 192 engaging extension guide rollers 191. The contour and/or shape of support arm underside channels 185 thus define the elevation of chair plate 104 by having guide roller 191 control selected pivoting of each support arm 192 using its inner end pivot mounting 195 to inner carriage 196 as its axis of rotation. There are no rollers on the support arms 192 and there are no cam surfaces on over-plate 162. Moreover, as support arms 192 extend, spacing is reduced between each extension guide roller 191 and the inner end pivot mounting 195 of its associated support arm 192. Likewise, when chair plate 104 is retracted (i.e., raised and pulled back into a motor vehicle), spacing increases between each extension guide roller 191 and the inner pivot 195 of its associated support arm 192.

Figure 17:
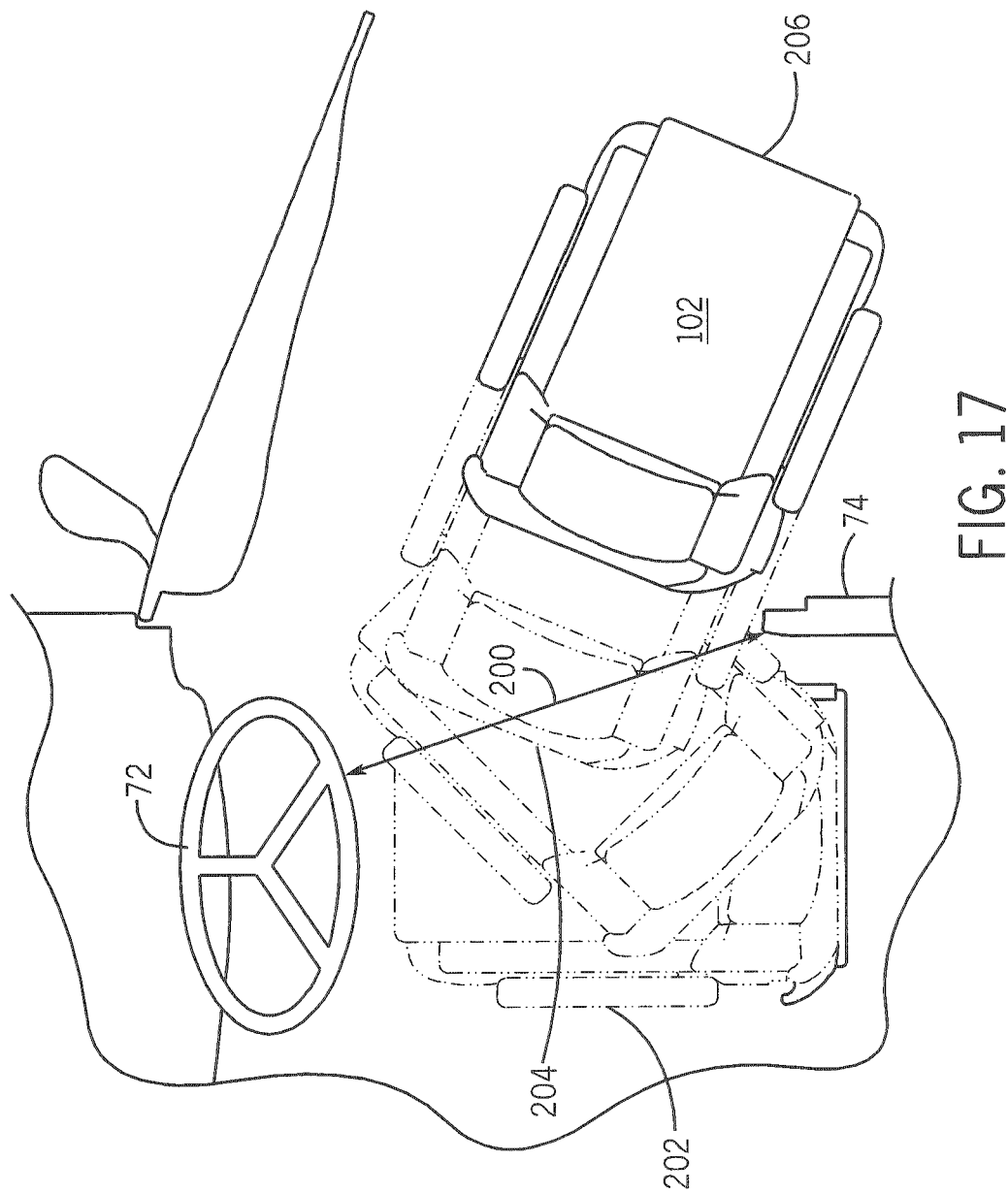
FIGS. 17 and 19 are time lapse top views of a user seat (i.e., not showing vertical movement of the seat) moving from a drive position to an access position according to one or more embodiments of an articulated seating system.
Figure 18:
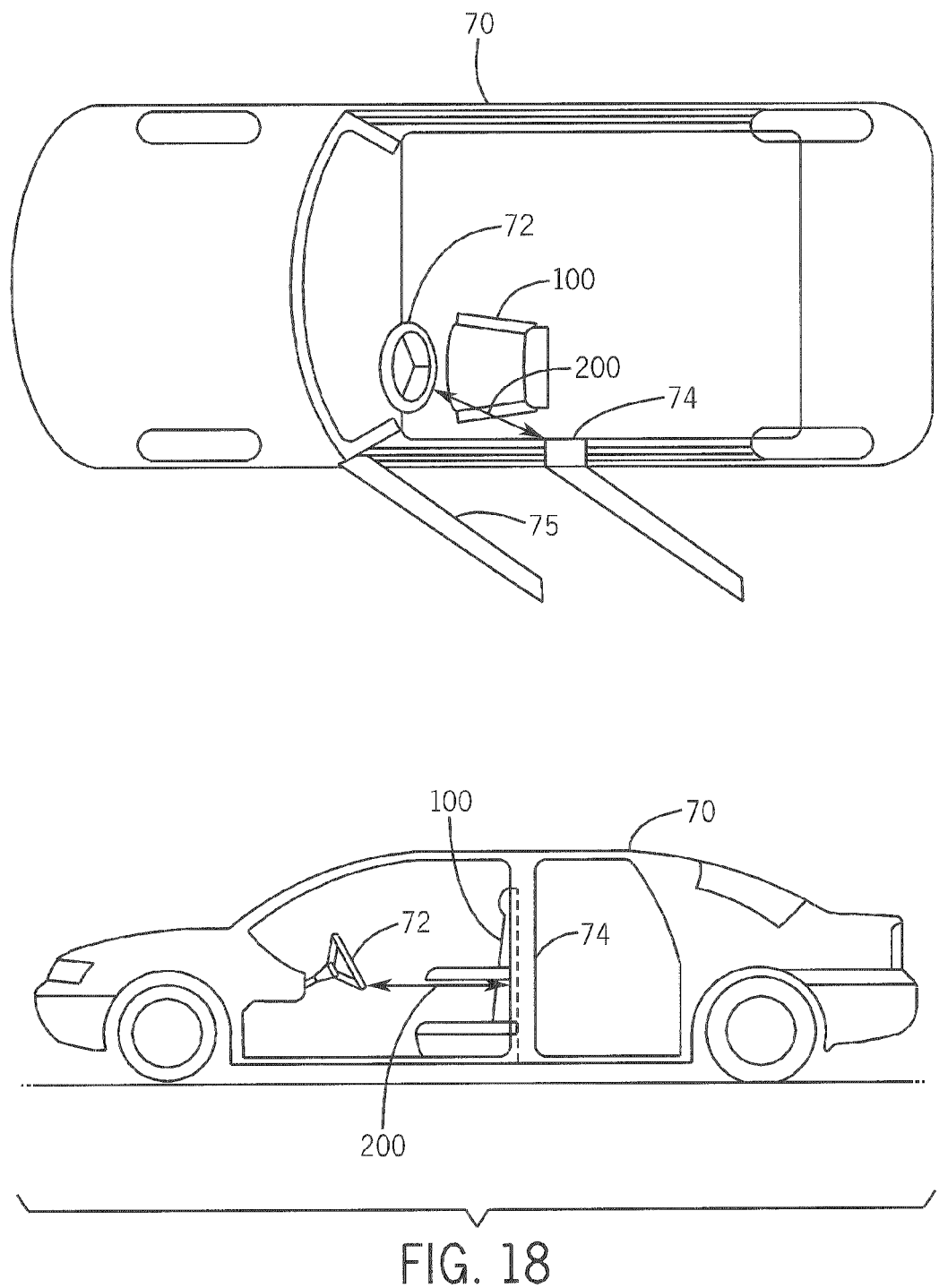
FIG. 18 is a combination of top and side views of a motor vehicle having a transition corridor.
Figure 19:
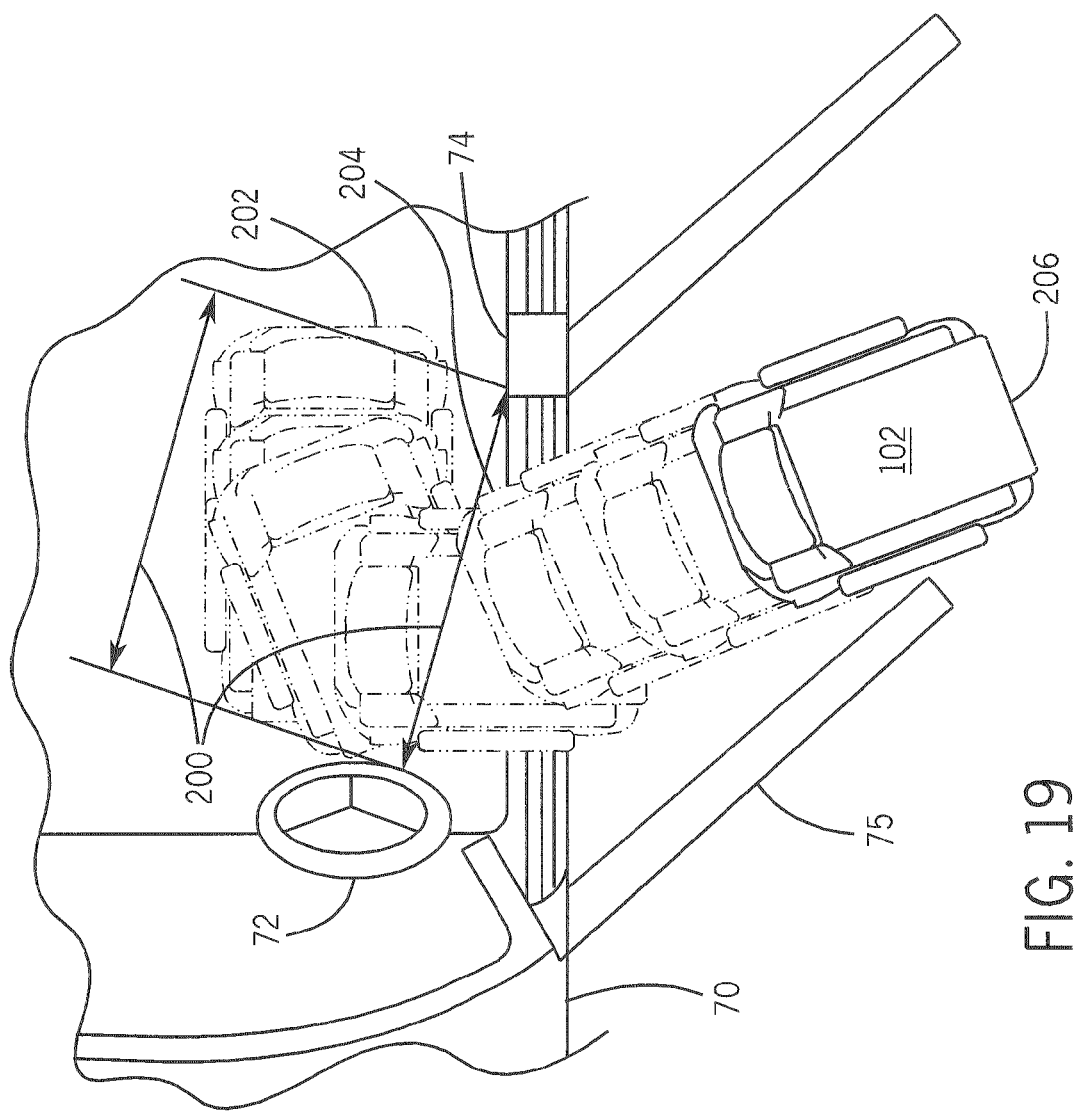
Figure 20:
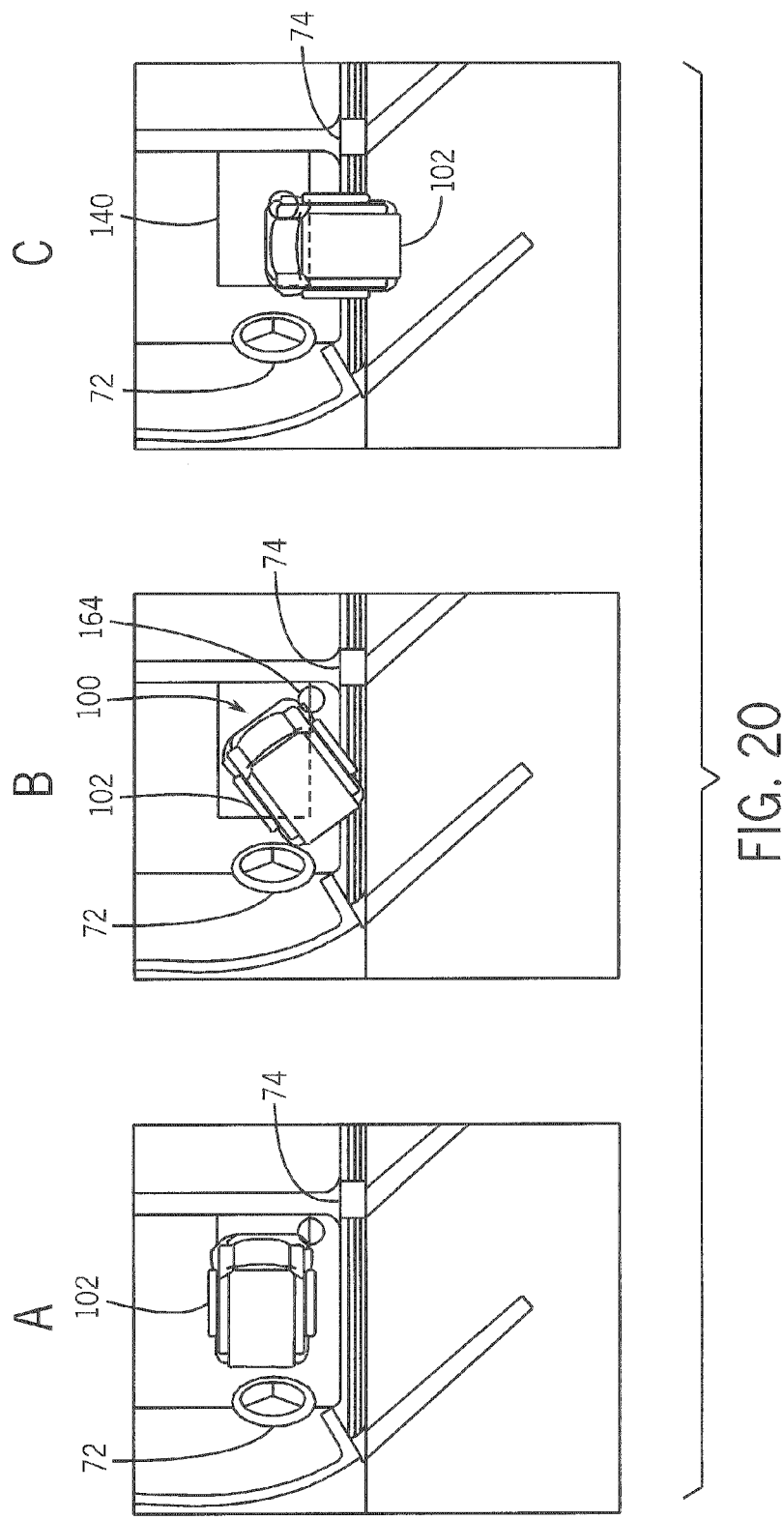
FIGS. 20 and 21 show top views of a sequence of steps A-F moving a user seat (i.e., not showing vertical movement of the seat) from a drive position in step A to an extension position in step D to an access position in step F.
Figure 21:
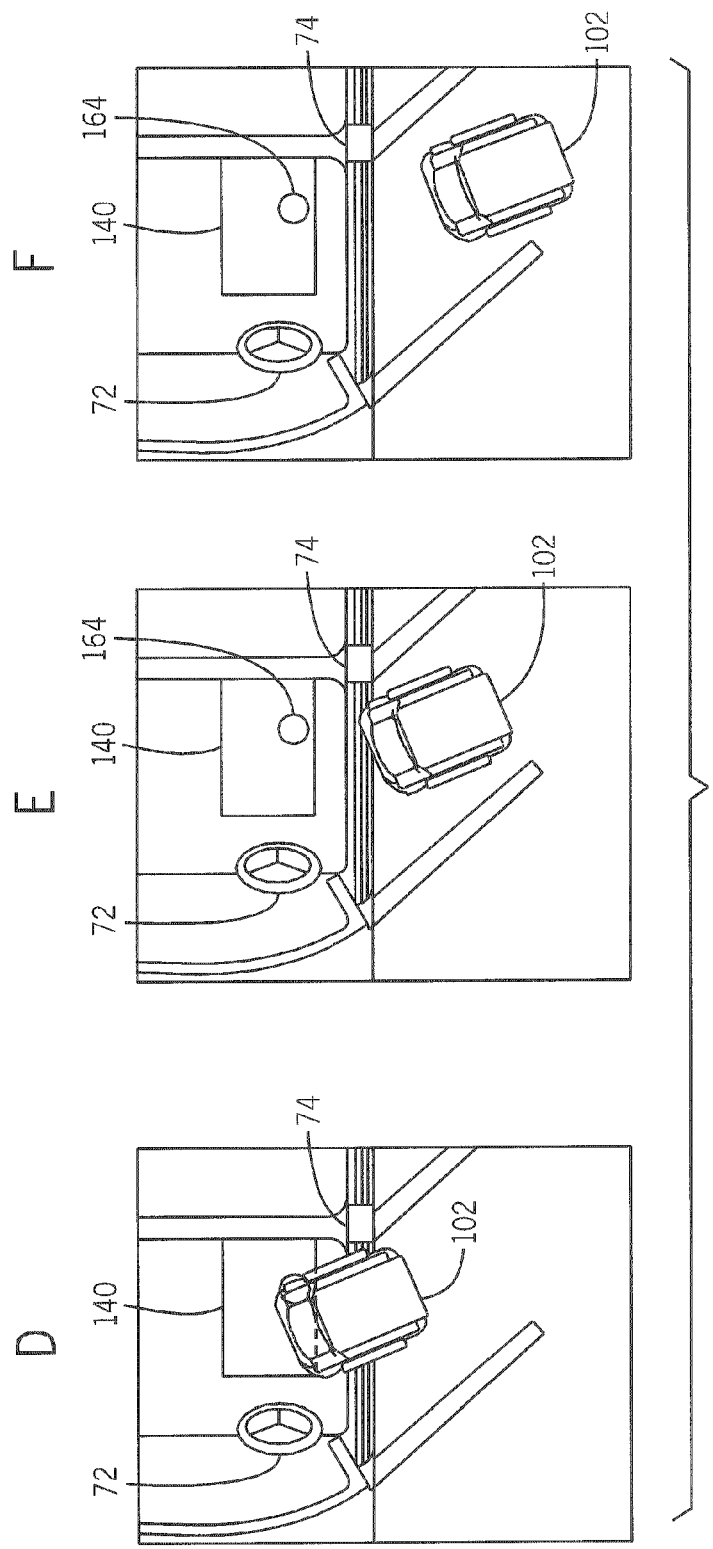
Figure 22:
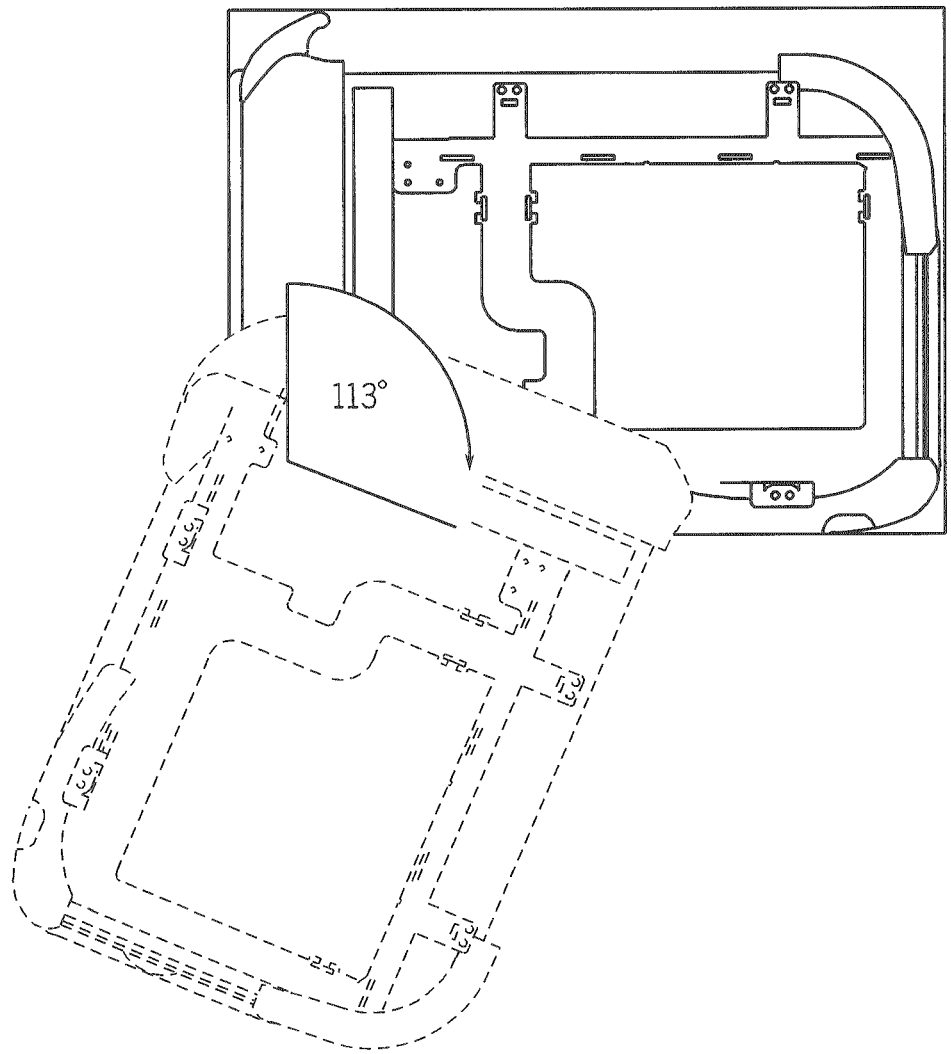
FIG. 22 shows the angular movement of a user seat during movement from a drive position to an extension position.

As noted above, embodiments of the articulated seating system 100 are adaptable to and usable in motor vehicles having smaller "transition corridors" than were compatible with earlier seating systems. For purposes of these illustrations, a "transition corridor" is defined as the minimum distance, travel path width, or spacing between a motor vehicle's B-pillar and a forward obstacle or motor vehicle structure, such as the steering wheel, as shown in FIGS. 17 and 18. Embodiments of the articulated seating system 100 herein can be used in motor vehicles in which that transition corridor is less than 20 inches and as small as 18 inches. In FIGS. 17 and 18, a motor vehicle 70 has a steering wheel 72 and a B-pillar 74 having a minimum spacing 200 and an articulated seating system 100 installed in the driver's position. FIG. 17 shows the progression of the user seat 102 as it moves from the drive position 202 to the extension position 204 to the access position 206. FIGS. 19-21 show similar embodiments and illustrate that same movement from drive position 202 to extension position 204 to access position 206 and back to the drive position 202, where the user seat can then be secured to permit secure operation of the motor vehicle by a motor vehicle driver using seat 102 in some embodiments. Securing the user seat in the drive position can by implemented by using latches, locks and/or other mechanical means or the like to ensure that the user seat does not unintentionally move from the drive position (e.g., during operation of the motor vehicle by a driver occupying the user seat).

The specific structure and operation of the support arms in some embodiments of the articulated seating system 100 achieve advantages over earlier systems. Use of extension guide rollers 191 coupled to the end of over-plate 162 allows the support arms 192 to engage and enclose the guide rollers 191 as the support arms 192 move (including later movement into or out of a motor vehicle and rotational movement using the support arms' pivot mountings 195 to inner slide mechanism 196), so that the spacing or interval between each roller extension guide roller 191 and the inner pivot mounting 195 of each arm 192 to mechanism 196 changes constantly as arm 192 is extended or retracted. This permits a range of different leverage configurations, which has not been possible with earlier systems. Small vertical movement changes can thus be easily performed when the support arms 192 are still substantially retracted, allowing for major or minor height adjustments in the position of user seat 102 for clearing a door opening, door structure, door component, or the like during the early portion of seat travel from the extension position inside the motor vehicle to the access position outside the motor vehicle.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. An articulated seating system comprising a user seat, the articulated seating system further comprising:
- an adapter plate configured to be affixed to a motor vehicle at a driver's seat position inside the motor vehicle;
- a user seat fore-aft slide assembly slidably coupled to the adapter plate and configured to move the user seat linearly fore and aft in a motor vehicle relative to the adapter plate;
- a user seat swivel assembly mounted to the fore-aft slide assembly using an off-center swivel post and configured to swivel the user seat to an extension position at least 90° relative to the direction of linear fore and aft movement; and
- a user seat extension assembly mounted to the swivel assembly and configured to move the user seat between an extension position in which the user seat has linearly moved forward and has rotated at least 90° relative to the direction of fore and aft movement and an access position that is lateral to and lower than the extension position;

wherein the user seat is movable between the extension position and a drive position in which the fore-aft slide assembly, the swivel assembly and the extension assembly are substantially above the adapter plate and below the user seat and in which the user seat is facing in a forward orientation;

further wherein the extension assembly comprises:
- a first carriage comprising a drive tab engaging a lift screw driven by an extension motor mounted to a weldment secured to the swivel assembly;
- a second carriage comprising the user seat;
- a drive shaft having a first end pivotably coupled to a linear rack mounted to the swivel assembly and having a second end pivotably coupled to the second carriage, the drive shaft controlling extension and retraction of the extension assembly by operation of the extension motor;
- a first push-rod having a first end pivotably coupled to the first carriage and having a second end pivotably coupled to the second carriage;
- a second push-rod having a first end pivotably coupled to the first carriage and having a second end pivotably coupled to the second carriage;
- a first support arm having a first end pivotably coupled to the first carriage and having a second end pivotably coupled to the second carriage, the first support arm having an underside channel engaging and at least partially enclosing a first extension guide roller rotatably mounted to the swivel assembly;
- a second support arm having a first end pivotably coupled to the first carriage and having a second end pivotably coupled to the second carriage, the second support arm having an underside channel engaging and at least partially enclosing a second extension guide roller rotatably mounted to the swivel assembly;

wherein each support arm underside channel is shaped to control the vertical position of the user seat as the first and second support arms are extended and retracted relative to the first and second extension guide rollers; and further wherein the swivel assembly comprises:
an over-plate;
a swivel motor mounted to the weldment;
a pinion coupled to the swivel motor, wherein the pinion engages an arcuate rack mounted to the under-plate;
the off-center swivel post mounted to the over-plate; and
the first and second guide rollers rotatably mounted to the over-plate.

2. The seating system of claim 1 wherein each support arm is pivotably coupled to the second carriage using an offset coupling that provides a lateral offset of the user seat.

3. The seating system of claim 2 wherein the pivotable coupling of the drive shaft first end comprises a first end geared coupling and further wherein the pivotable coupling of the drive shaft second end comprises a second end geared coupling to synchronize the angular movement of the drive shaft relative to the over-plate with the angular movement of the user seat relative to the drive shaft.

4. The seating system of claim 1 wherein the fore-aft slide assembly comprises:
- an under-plate;
- a plurality of fore-aft slide rollers rotatably mounted to the under-plate, the fore-aft slide rollers engaging first and second side channels on the adapter plate to guide linear movement of the user seat relative to the adapter plate; and
- a slide motor coupled to the under-plate and configured to move the under-plate linearly relative to the adapter plate.

5. The seating system of claim 4 wherein the slide motor, the swivel motor and the extension motor each can be selectively operated manually to move the user seat to the drive position.

6. The seating system of claim 5 wherein the fore-aft slide assembly and the swivel assembly work in concert to move the user seat through a transition corridor during movement between the drive position and the extension position.

7. The seating system of claim 6 wherein the transition corridor is less than 24 inches wide.

8. The seating system of claim 6 wherein the transition corridor is less than 22 inches wide.

9. The seating system of claim 5 wherein the fore-aft slide assembly, the swivel assembly and the extension assembly work in concert to move the user seat through a transition corridor during movement between the drive position and the extension position.

10. In combination with a motor vehicle, an articulated seating system comprising:
- an adapter plate having sidewall channels, the adapter plate bolted to the motor vehicle at a motor vehicle seat location;
- a slide motor mounted to an under-plate having a plurality of rotatable slide rollers engaging the adapter plate sidewall channels, the slide motor and under-plate configured to permit selective linear movement of the under-plate relative to the adapter plate;
- an arcuate rack affixed to an under-plate upper surface and a pivot hole in the under-plate, the pivot hole generally concentric with the arcuate rack;
- an over-plate and a swivel post mounted to an over-plate bottom surface, wherein the swivel post engages the under-plate pivot hole;
- a swivel motor coupled to the over-plate and comprising a pinion engaging the arcuate rack, the swivel motor configured to permit controlled rotation of the over-plate relative to the under-plate;
- a first extension carriage and a second extension carriage, the first extension carriage comprising an extension motor and lift screw coupled to a weldment mounted to the over-plate, a drive tab mounted to the first carriage engaging the lift screw, and the extension second carriage comprising a seat bracket supporting a user seat mounted thereto;
- a pair of push-rods, each push-rod having a first end pivotably coupled to the first extension carriage and having a second end pivotably coupled to the second extension carriage;

a pair of support arms, each support arm having a first end pivotably coupled to the first extension carriage and having a second end pivotably coupled to the second extension carriage using an offset coupling to offset the user seat relative to the pair of support arms, each support arm comprising a contoured underside channel that at least partially encloses an extension guide roller rotatably mounted to the over-plate, wherein the spacing between each extension guide roller and the pivotably coupled first end of each support arm changes as the first extension carriage is extended and retracted; and a drive shaft pivotably coupled to the first extension carriage using a first end gear connection and pivotably coupled to the second extension carriage using a second end gear connection;

wherein the underside channels on the support arms are contoured to control the vertical position of the user seat as the first carriage is extended and retracted.

11. The seating system of claim 10 wherein the slide motor and the swivel motor move the user seat between a drive position in which the user seat is in a generally forward-facing orientation in the motor vehicle seat location and an extension position in which the user seat is rotated at least 90° from the drive position and is facing generally outward through an access-way of the motor vehicle; and further wherein an extension assembly moves the user seat out of and into the motor vehicle while the user seat is lowered and raised, respectively, to move the user seat between the extension position and an access position outside the motor vehicle, wherein the extension assembly comprises the extension motor, the pair of push-rods, the pair of support arms and the drive shaft.

12. The seating system of claim 10 further comprising a stop pin mounted to the over-plate and a limit tab adjacent the under-plate pivot hole, wherein the stop pin prevents operation of the extension motor unless the over-plate has rotated a preselected amount relative to the under-plate.

13. The seating system of claim 10 wherein the motor vehicle seat location is the motor vehicle driver's seat location.

14. The seating system of claim 13 wherein the motor vehicle comprises a steering wheel, a B-pillar, and a transition corridor of less than 24 inches between the motor vehicle steering wheel and the motor vehicle B-pillar, further wherein the user seat moves through the transition corridor as the user seat moves between a drive position in which the user seat is in a generally forward-facing orientation in the motor vehicle seat location and an extension position in which the user seat is rotated at least 90° from the drive position and is facing generally outward through an access-way of the motor vehicle.

15. In combination with a motor vehicle having a steering wheel, a B-pillar, a chassis, and a transition corridor of less than 22 inches between the motor vehicle steering wheel and the motor vehicle B-pillar, an articulated seating system comprising:

a mounting assembly configured to be secured to a motor vehicle interior in approximately the motor vehicle driver's seat location, the mounting assembly comprising an adapter plate bolted to the motor vehicle chassis and having fore-aft slide assembly guides comprising sidewall channels;

a fore-aft slide assembly configured to move the user seat linearly fore and aft relative to the mounting assembly within a motor vehicle, the fore-aft slide assembly comprising:

an under-plate having a plurality of rollers mounted to the under-plate, the fore-aft slide assembly rollers engaging and configured to slide the under-plate linearly within the sidewall channels;

a slide motor coupled to the under-plate and configured to selectively move the under-plate linearly in the sidewall channels;

an arcuate rack affixed to an under-plate upper surface; and an under-plate pivot hole generally concentric to the rack;

a swivel assembly above and engaging the fore-aft slide assembly, the swivel assembly comprising:

an over-plate having a swivel post structure mounted to an over-plate bottom surface, wherein the swivel post structure engages the pivot hole to permit controlled rotation of the swivel assembly relative to the fore-aft slide assembly, the swivel post structure comprising a spring-loaded stop pin configured to engage a stop tab on the under-plate adjacent to the pivot hole; and a swivel motor mounted to the over-plate, the swivel motor comprising a pinion engaging the arcuate rack; and an extension assembly comprising a user seat mounted to a chair plate, the extension assembly further comprising:

an inner carriage and an outer carriage coupled to the chair plate;

the inner carriage comprising a tab engaging a lift screw coupled to an extension motor mounted to the swivel assembly;

a drive shaft having a first geared connection to a linear rack mounted to the swivel assembly and a second geared connection to the outer carriage to synchronize rotation of the drive shaft and rotation of the outer carriage, the chair plate and the user seat;

a pair of push-rods having first ends pivotably coupled to the inner carriage and second ends pivotably coupled to the outer carriage;

a pair of support arms having first ends pivotably coupled to the inner carriage and second ends pivotably coupled to the outer carriage, each support arm having a contoured underside channel that encloses an extension roller mounted to the swivel assembly, wherein the spacing between the extension rollers and the pivot coupling of the support arms to the inner carriage changes as the inner carriage is extended and retracted;

wherein the contouring of the underside channels on the support arms controls the vertical position of the user seat as the inner carriage is extended and retracted by the extension motor driving the drive shaft;

wherein the fore-aft slide assembly and swivel assembly move the user seat between a drive position in which the user seat is in a generally forward-facing orientation in the motor vehicle and an extension position in which the user seat is facing generally outward through a motor vehicle access-way;

further wherein the extension assembly moves the user seat out of and into the motor vehicle while the user seat changes vertical position to move the user seat from the extension position to an access position outside the motor vehicle.

* * * * *